(12) United States Patent
Nasu et al.

(10) Patent No.: US 11,327,724 B2
(45) Date of Patent: May 10, 2022

(54) SYSTEM AND METHOD THAT SUPPORT APPLICATION SOFTWARE DEVELOPMENT

(71) Applicant: Hitachi, Ltd., Tokyo (JP)

(72) Inventors: Hiroshi Nasu, Tokyo (JP); Junji Kinoshita, Tokyo (JP); Keisuke Hatasaki, Tokyo (JP); Toshio Nishida, Tokyo (JP); Yuki Naganuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 16/574,476

(22) Filed: Sep. 18, 2019

(65) Prior Publication Data

US 2020/0264847 A1 Aug. 20, 2020

(30) Foreign Application Priority Data

Feb. 14, 2019 (JP) .............................. JP2019-024935

(51) Int. Cl.
| | |
|---|---|
| *G06F 9/34* | (2018.01) |
| *G06F 8/34* | (2018.01) |
| *G06F 8/77* | (2018.01) |
| *G06F 8/60* | (2018.01) |
| *G06F 8/33* | (2018.01) |
| *G06F 8/36* | (2018.01) |

(52) U.S. Cl.
CPC .................. *G06F 8/34* (2013.01); *G06F 8/60* (2013.01); *G06F 8/77* (2013.01); *G06F 8/33* (2013.01); *G06F 8/36* (2013.01)

(58) Field of Classification Search
CPC ...... G06F 8/33; G06F 8/34; G06F 8/36; G06F 8/60; G06F 8/77
See application file for complete search history.

(56) References Cited

U.S. PATENT DOCUMENTS 10,452,372 B2 * 10/2019 Lundberg .................. G06F 8/60
2017/0064038 A1 3/2017 Chen et al.

OTHER PUBLICATIONS

Javier Rojas Balderrama et al., Combining Workflow Templates with a Shared Space-based Execution Model, IEEE, 2014, retrieved online on Feb. 15, 2022, pp. 1-9. Retrieved from the Internet: <URL: https://ieeexplore.IEEE.org/stamp/stamp.jsp?tp=&arnumber=7019862>. (Year: 2014).*

* cited by examiner

*Primary Examiner* — Hanh Thi-Minh Bui
(74) *Attorney, Agent, or Firm* — Mattingly & Malur, PC

(57) ABSTRACT

When flow data of flow is to be downloaded from a flow template manager to a flow editor, a system receives a first request to deploy an external service corresponding to an invoke node in the flow, and transmits a second request to deploy an external service identified by the first request to a service deployment manager associated with a site corresponding to the external service. The service deployment manager deploys an external service identified by the second request on a service execution platform at the site, and returns a response associated with an invocation destination end point corresponding to the external service. The system returns a first response associated with an invocation destination end point set to a property of the invoke node by the flow template manager to a transmission source of the first request.

11 Claims, 19 Drawing Sheets

FIG. 3C

Download of flow template — 301C

- Flow repository URL: ____ 3031
- Project name: ____ 3032
- User name: ____ 3033
- Password: ____ 3034
- Flow editor URL: ____ 3035
- Access token: ____ 3036
- External service deployment: [ Deploy ] 3037

[ Download ]  [ Cancel ]

FIG. 3D

Deployment of external service — 301D

- ○ All new local deployment (charge-free plan only) — 3041
- ⦿ Individual deployment (paid plan can be selected) — 3042

| External service name | Plan name 3047 | Site name | API invocation limit |
|---|---|---|---|
| External service 1 | ExSvc-1 plan F ▽ | Site X | 5000 / day |
| External service 2 | ▽ | | |

ExSvc-1 plan F
ExSvc-1 plan P1
ExSvc-2 plan P2

3047

[ Deploy ] 3048   [ Cancel ] 3049

FIG. 7

Table of flow template manager

324

Flow template table

| Flow table ID | Flow template name | Flow ID | ExSvc ID | Contents ID |
|---|---|---|---|---|
| ft-001 | Template 1 | flow-001 | [exsvc-1, exsvc-2] | contents-001 |
| ft-002 | Template 2 | flow-002 | [exsvc-3] | contents-002 |
| ... | ... | ... | ... | ... |

32401　32402　32403　32404　32405

325

Flow table

| Flow ID | Flow— |
|---|---|
| flow-001 | {..., ..., ...} |
| flow-002 | {..., ..., ...} |
| ... | ... |

32501　32502

326

Contents table

| Contents ID | Contents |
|---|---|
| contents-001 | {..., ..., ...} |
| contents-002 | {..., ..., ...} |
| ... | ... |

32601　32602

327

External service plan table

| Plan ID | Plan name | Free of charge | ExSvc ID | Site ID | API invocation limit |
|---|---|---|---|---|---|
| exsvc-1-0 | ExSvc-1 plan F | true | exsvc-1 | [site-x] | {5000, day} |
| exsvc-1-1 | ExSvc-1 plan P1 | false | exsvc-1 | [site-x] |  |
| exsvc-2-0 | ExSvc-2 plan F | true | exsvc-2 | [site-x] | {1000, hour} |
| ... | ... | ... | ... | ... | ... |

Table of external service manager

523 Invoke node table

| Invoke node ID | ExSvc ID |
|---|---|
| exnode-a | [exsvc-1] |
| exnode-b | [exsvc-2] |
| exnode-c | [exsvc-2, exsvc-3] |
| ... | ... |

52301  52302

524 External service table

| ExSvc ID | ExSvc name | Site ID |
|---|---|---|
| exsvc-1 | ExSvc-1 | [site-x] |
| exsvc-2 | ExSvc-2 | [site-x, site-y] |
| exsvc-3 | ExSvc-3 | [site-y] |
| ... | ... | ... |

52401  52402  52403

525 Service-deployment-manager table

| Service deployment manager ID | End point | Site ID |
|---|---|---|
| dm-x | https://sb-x.local/ | site-x |
| dm-y | https://sb-y.remote/ | site-y |
| ... | ... | ... |

52501  52502  52503

526 Site table

| Site ID | Site name | Local |
|---|---|---|
| site-x | Site X | true |
| site-y | Site Y | false |

52601  52602  52603

527 Node manager table

| End point |
|---|
| https://nm-x.local/ |

52701

SYSTEM AND METHOD THAT SUPPORT APPLICATION SOFTWARE DEVELOPMENT

CROSS-REFERENCE TO PRIOR APPLICATION

This application relates to and claims the benefit of priority from Japanese Patent Application number 2019-24935, filed on Feb. 14, 2019 the entire disclosure of which is incorporated herein by reference.

BACKGROUND

The present invention generally relates to a technology that supports application software development.

A visual programming tool is available as a programming tool that allows application software development by illustrating a model diagram without writing source codes. Examples of such tools include Node-RED (https://nodered.org/). In application software development using the visual programming tool, a developer sets information corresponding to usage, environment, and other conditions as necessary to the property of a node that expresses processing, and produces a flow made of a plurality of nodes and a line representing the relation (for example, processing flow) between nodes. The property includes one or a plurality of property elements each including a property item and a property value. The property value is, for example, an information acquisition destination (end point), and the relation between nodes is, for example, a data flow. An application software developer (hereinafter referred to as "developer") can intuitively develop, by using such a visual programming tool with insufficient knowledge of software development, application software that performs intended processing. The visual programming tool may be referred to as "model development environment". Each node represents a software component or processing unit, and each connection line between nodes may be referred to as "edge". The node and the edge are digraph terms, and a flow diagram in Node-RED can be regarded as a digraph. In the present specification, flow diagram, block diagram, and digraph are synonymous with each other, and thus a flow diagram is simply referred to as a "flow", and "flow" and "graph" are synonymous with each other.

In the field of application software development, the development period is often shortened by using an application software template prepared in advance. The application software developer can shorten the development period by acquiring a template suitable for a purpose from a list of templates and changing any necessary part of the acquired template, thereby efficiently developing application software.

The same method is applicable in flow development with a visual programming tool. It is expected that the developer can efficiently perform application development by acquiring and changing a flow template.

Patent Literature 1: US2017/0064038A1

SUMMARY

In application development using a visual programming tool, a developer can use a template, which eliminates the need to perform node disposition and inter-node wiring from scratch, and thus efficient application development can be expected.

When using an invoke node that invokes an application programming interface (API) of an external service outside of a flow execution platform of the visual programming tool and executes processing of the external service, the developer needs preparation including deployment of the external service, setting of access information (end point) such as the URL of the external service API and authentication for API execution, and registration of an end point and an authentication token to a node property. This preparation work increases the number of tasks performed by the developer and thus prevents efficient development. As the number of external services to be used increases, a preparation work load on the developer increases.

Patent Literature 1 discloses a technology of dynamically reflecting, to an application, API set information of an external service deployed in advance.

Thus, in the technology of Patent Literature 1, external service deployment needs to be performed in advance. This requires the developer to know in advance to which external service the invoke node of the visual programming tool corresponds.

According to one embodiment of the present invention, a system that supports application software development (hereinafter referred to as a support system) is established by achieving cooperation between a flow template manager and a service deployment manager. Specifically, when flow data of flow indicated by a flow template is downloaded from the flow template manager to a flow editor of a visual programming tool, the support system receives a first request as a request to deploy an external service corresponding to an invoke node in the flow. An invocation destination end point in a property of the invoke node in the flow template is undetermined as a property value. The support system transmits a second request as a request to deploy an external service identified by the first request to a service deployment manager associated with a site corresponding to the above-described external service in accordance with the first request. The service deployment manager deploys an external service identified by the second request on a service execution platform at the site and returns a second response as a response associated with an invocation destination end point corresponding to the external service to a transmission source of the second request. The support system returns a first response as a response associated with an invocation destination end point obtained from the second response and set to the property of the invoke node by the flow template manager to a transmission source of the first request.

Accordingly, the invocation destination end point of the invoke node in the flow downloaded to the flow editor is already set to the property of the invoke node. This leads to reduction of a load on a developer in preparation for using an external service.

BRIEF DESCRIPTION OF THE DRAWINGS

FIG. 3C is a diagram illustrating an exemplary flow template manager GUI;

FIG. 3D is a diagram illustrating an exemplary flow template manager GUI;

FIG. 7 is a diagram illustrating an exemplary configuration of a table held at the flow template manager;

FIG. 8 is a diagram illustrating an exemplary configuration of a table held at the external service manager;

DESCRIPTION OF EMBODIMENTS

Figure 1:
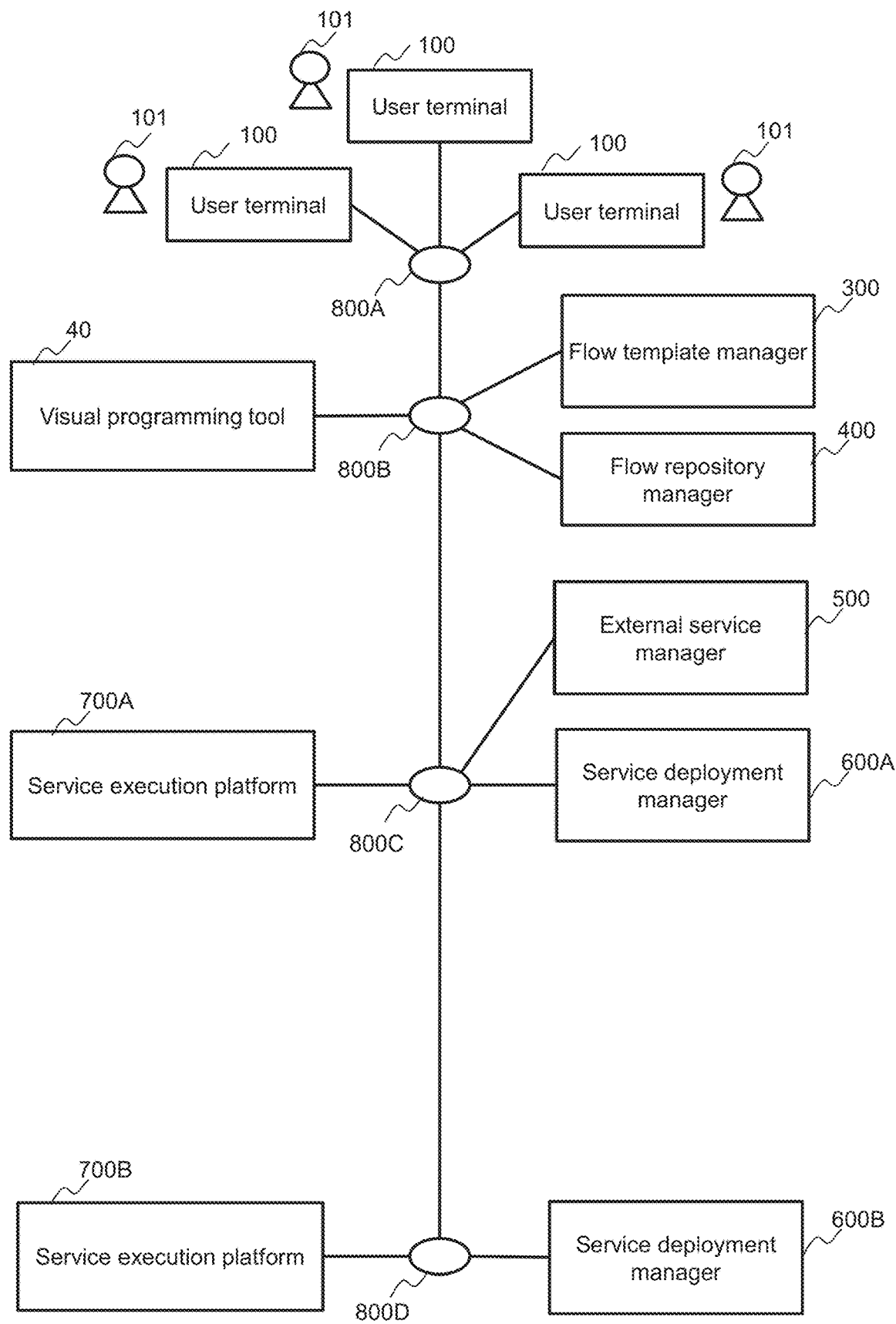
FIG. 1 is a block diagram illustrating an exemplary system configuration in an embodiment of the present invention.

In the following description, "interface apparatus" may be one or more interface devices. The one or more interface devices may be each at least one of devices below.

One or more Input/output (I/O) interface devices. Each Input/output (I/O) interface device is an interface device for at least one of an I/O device and a display computer at a remote site. The I/O interface device for a display computer may be a communication interface device. At least one of the I/O devices may be a user interface device, for example, any one of an input device such as a keyboard or a pointing device and an output device such as a display device.

One or more communication interface devices. The one or more communication interface devices may be one or more communication interface devices (for example, one or more network interface cards (NICs)) of the same kind or may be a plurality of communication interface devices (for example, an NIC and a host bus adapter (HBA)) of different kinds.

In the following description, "memory" is one or more memory devices, and may be typically main storage devices. At least one of the memory devices of the memory may be a volatile memory device or a non-volatile memory device.

In the following description, "permanent storage apparatus" is one or more permanent storage devices. Each permanent storage device is typically a non-volatile storage device (for example, an auxiliary storage device), and specifically, for example, a hard disk drive (HDD) or a solid state drive (SSD).

In the following description, "storage apparatus" may be at least a memory among the memory and a permanent storage apparatus.

In the following description, "processor" is one or more processor devices. At least one of the processor devices is typically a micro processor device such as a central processing unit (CPU), but may be a processor device of a different kind such as a graphics processing unit (GPU). At least one of the processor devices may include a single core or multiple cores. At least one of the processor devices may be a processor core. At least one of the processor devices may be a general processor device such as a hardware circuit (for example, a field-programmable gate array (FPGA) or an application specific integrated circuit (ASIC)) configured to perform part or all of processing.

In the following description, the expression "xxx table" means information from which an output can be obtained for an input. The information may be data having any structure or may be a learning model such as a neural network that generates an output for an input. Thus, "xxx table" may be also referred to as "xxx information". In the following description, the configuration of each table is merely exemplary, and one table may be divided into a plurality of tables or may include all or some of a plurality of tables.

In the following description, processing is described with a "computer program" as a subject in some cases. However, the computer program performs determined processing by using a storage apparatus, an interface apparatus, and/or the like as appropriate when executed by a processor, and thus the subject of the processing may be the processor (or a device such as a controller including the processor). The computer program may be installed from a program source onto an apparatus such as a computer. The program source may be, for example, a (non-temporary, for example) recording medium readable by a program distribution server or a computer. In the following description, a plurality of computer programs may be achieved as one computer program, or one program may be achieved as a plurality of computer programs.

In the following description, the expression "kkk unit" means a function in some cases. The function may be achieved by a processor executing one or more computer programs, or may be achieved by one or more hardware circuits (for example, FPGA or ASIC). When the function is achieved by a processor executing a computer program, determined processing is performed by using a storage apparatus, an interface apparatus, and/or the like as appropriate, and thus the function may be at least part of the processor. Processing described with the function as a subject may be processing performed by a processor or an apparatus including the processor. The computer program may be installed from a program source. The program source may be, for example, a recording medium (for example, a non-temporary recording medium) readable from a program distribution computer or a computer. Description of each function is merely exemplary, and a plurality of functions may be collected as one function, or one function may be divided into a plurality of functions.

In the following description, "computer system" means a system including one or more physical computers. Each physical computer may be a general-purpose computer or a dedicated computer.

In the following description, a common part of reference signs is used when elements of the same kind are not distinguished from each other, and the reference signs are used when the elements of the same kind are distinguished from each other in some cases. For example, "service execution platform 700" is used when service execution platforms are not distinguished from each other, and "service execution platform 700A", "service execution platform 700B", and the like are used when the service execution platforms are distinguished from each other in some cases.

In the following description, "external service" means a service (for example, a service not supported by a visual programming tool (flow execution platform)) executed on an execution platform outside of the visual programming tool (flow execution platform). In the drawings, the external service is also abbreviated as "ExSvc".

The following describes an embodiment of the present invention with reference to the accompanying drawings.

<Outline>

Figure 17:
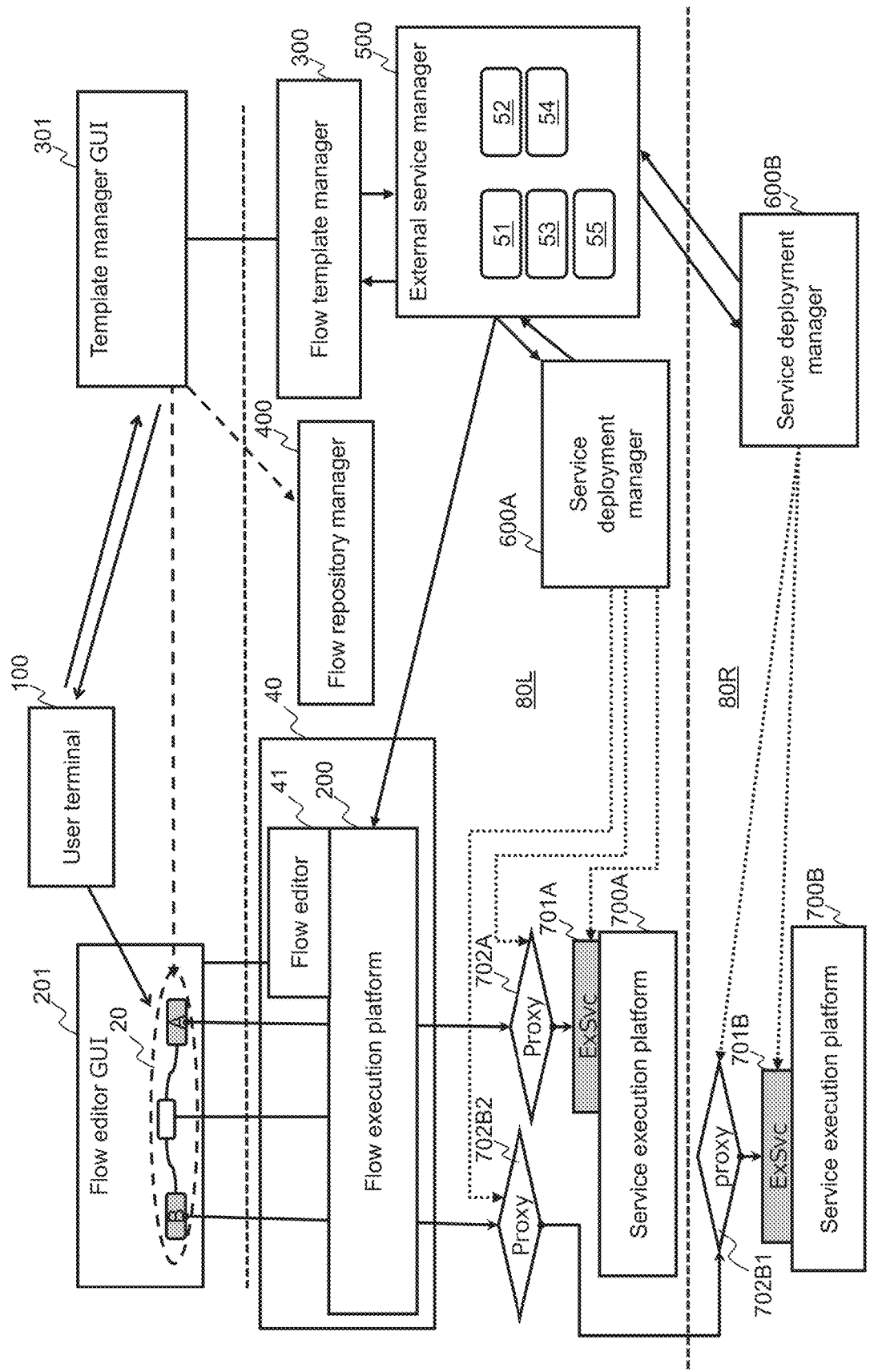
FIG. 17 is a diagram illustrating the outline of the embodiment.

FIG. 17 is a diagram illustrating the outline of an embodiment.

A local site 80L is a site at which a flow execution platform 200 of a visual programming tool 40 exists. A remote site 80R is any site other than the local site 80L. The number of sites may be one, but in the present embodiment, there are at least two sites in this manner.

The visual programming tool 40, a flow repository manager 400, a flow template manager 300, a service deployment manager 600A, a service execution platform 700A, and an external service manager 500 exist at the local site 80L. A service deployment manager 600B and a service execution platform 700B exist at the remote site 80R. Each above-described element existing at the site 80 may be a computer system or a function achieved by the computer system. The visual programming tool 40 and the flow template manager 300 can be accessed from a user terminal 100. The user terminal 100 is an information processing terminal (typically, a computer such as a personal computer) used by a user (for example, a developer). The user terminal 100 executes, for example, a web browser (exemplary browser).

The visual programming tool 40 includes a flow editor 41 (flow development platform) and the flow execution platform 200. The flow editor 41 provides, to the web browser executed by the user terminal 100, a flow editor graphical user interface (GUI) 201 through which flow edition is received from the user. In the present embodiment, "flow" is an application software flow expressed with a plurality of nodes and a connection line between nodes among the plurality of nodes. The flow execution platform 200 is an execution platform for the plurality of nodes. When the plurality of nodes include an invoke node corresponding to an external service, the flow execution platform 200 invokes an external service 701 (or a proxy 702 thereof) associated with the invoke node. A flow 20 exemplarily illustrated in FIG. 1 includes invoke nodes A and B, and a node C expressing a service (processing module) executed on the flow execution platform 200.

The flow repository manager 400 stores flow data (for example, data expressed in a source code) indicating a flow.

The flow template manager 300 manages one or more (typically, a plurality of) flow templates. The flow template manager 300 provides, to the web browser executed by the user terminal 100, a template manager GUI 301 that displays a list of flow templates and through which selection of a flow template desired by the user from the list is received.

At least one service deployment manager 600 exists at, for example, each site 80. The service deployment manager 600 deploys the external service 701 and the proxy 702 thereof at the site 80 (specifically, the service execution platform 700 at the site 80) corresponding to the manager 600.

The service execution platform 700 executes the external service 701 deployed at the platform 700, an external instance as the proxy 702 of the external service 701, and a proxy instance of the proxy 702.

The external service manager 500 includes a request reception unit 51, a request transmission unit 52, a response reception unit 53, a response transmission unit 54, and a node addition unit 55.

When a flow template is selected through the template manager GUI 301, the flow 20 indicated by the selected flow template is downloaded from the flow template manager 300 to the flow editor 41 of the visual programming tool 40. Each node is associated with a property having one or a plurality of property elements each including a property item and a property value, but in the property associated with each of the invoke nodes A and B in the flow 20 indicated by the flow template, the invocation destination end point of the invoke node is undetermined as a property value. When such download is performed, the external service manager 500 achieves cooperation between the flow template manager 300 and the service deployment manager 600, thereby achieving application software development support, and specifically achieving that an invocation destination end point is already set to the property of each of the invoke nodes A and B in the flow 20 downloaded to the flow editor 41. More specific description is given below.

Specifically, when the above-described download is performed, the request reception unit 51 receives, from the flow template manager 300, one or more requests to deploy external services 701A and 701B corresponding to the invoke nodes A and B included in the flow 20. The one or more requests may be one or a plurality of requests corresponding to one or a plurality of invoke nodes, respectively, or may be one request corresponding to one or a plurality of invoke nodes. Each of the "one or more requests" is an exemplary first deployment request. In the present embodiment, the first deployment request is provided for each invoke node.

The first deployment request associates the external service ID of the external service 701 with the site ID of the site 80 as a deployment destination of the external service 701. In addition, in the present embodiment, the first deployment request sometimes associates the external service 701 with at least one of the user ID of the user, the group ID (namespace) of a group (for example, a development team) to which the user belongs, and an API invocation limit (exemplary limit argument as an argument related to the invocation limit of the external service) indicating a limit on the number of times of API (end point) invocation of the external service 701 or the proxy thereof, (API stands for application programming interface). The API invocation limit of the external service 701 depends on a specified plan among one or more plans prepared for the external service 701.

The request transmission unit 52 transmits a second deployment request as a request to deploy the external service 701 identified by the first deployment request to the service deployment manager 600 associated with the site 80 corresponding to the external service 701 in accordance with the above-described first deployment request. The second deployment request is associated with an external service ID corresponding to the site 80 and specified by the first deployment request. The service deployment manager 600 having received the second deployment request deploys the external service 701 identified by the second deployment request on the service execution platform 700 at the site 80, and returns a second deployment response as a response associated with an invocation destination end point corresponding to the external service 701 to the transmission source of the second deployment request (in this example, the external service manager 500). The response reception unit 53 receives the second deployment response from the service deployment manager 600. The "invocation destination end point corresponding to the external service 701" is at least one of the end point of the external service 701 and the end point of the proxy of the external service 701.

The response transmission unit 54 returns a first deployment response as a response associated with an invocation destination end point obtained from the second deployment response from the service deployment manager 600 and set to the property of an invoke node by the flow template manager 300 to the flow template manager 300 (exemplary transmission source of the first deployment request). Accordingly, the flow template manager 300 specifies an invocation destination end point related to the external service 701 corresponding to an invoke node from the first deployment response, and sets the invocation destination end point to the property of the invoke node. The flow 20 in which the invocation destination end point is already set to the property of the invoke node is downloaded to the flow editor 41.

In the present embodiment, the second deployment request of the external service 701 is a request to deploy the proxy 702 of the external service 701 in addition to the external service 701.

For example, the service deployment manager 600A deploys a proxy 702A of the external service 701A in addition to the external service on, for example, the service execution platform 700A in response to the second deployment request of the external service 701A. In this case, the second deployment response to the second deployment request is associated with the invocation destination end point of the proxy 702A, and as a result, the invocation destination end point of the proxy 702A is set to the property of the invoke node 701A corresponding to the external service 701A.

For example, as for the external service 701B, the deployment destination of which is the remote site 80R, the request transmission unit 52 transmits a second deployment request to deploy the external service 701B and a proxy 702B1 thereof to the service deployment manager 600B corresponding to the remote site 80R, and also transmits a second deployment request to deploy a proxy 702B2 (proxy of the external service 701B) configured to perform communication with the proxy 702B1 to the service deployment manager 600A corresponding to the local site 80L. Accordingly, the external service 701B and a proxy 702B1 thereof are deployed on the service execution platform 700B by the service deployment manager 600B. In addition, the proxy 702B2 configured to perform communication with the proxy 702B1 is deployed on the service execution platform 700A by the service deployment manager 600A. In this case, the first deployment response is associated with the end point of the proxy 702B2 as an invocation destination end point associated with the invoke node B corresponding to the external service 701B.

A case in which the proxy 702 is deployed for the external service 701 may be a case in which the first deployment request is associated with the API invocation limit for the external service 701. In this case, for example, the second deployment request of the external service 701A is associated with the API invocation limit corresponding to the external service 701A. API authentication information corresponding to the proxy 702A is obtained based on the API invocation limit by the service deployment manager 600A having received the second deployment request, and is associated with the deployed proxy 702A and the second deployment response. The first deployment response is associated with the end point of the proxy 702A as an invocation destination end point associated with the invoke node A corresponding to the external service 701A, and is associated with API authentication information set as a property value to the property of the invoke node A by the flow template manager. Accordingly, the API authentication information is already set to the property of the invoke node A in the flow 20 downloaded to the flow editor 41.

In the present embodiment, when the first deployment request from the flow template manager 300 is associated with the group ID of the group to which the user belongs for the external service 701, the second deployment request of the external service 701 is associated with the group ID. Accordingly, the external service 701 (and the proxy 702 thereof) is deployed in a space (logical space on the service execution platform 700 at the deployment destination) corresponding to the group ID by the service deployment manager 600 having received the second deployment request. In this manner, instances of an identical external service can be disposed in a plurality of spaces different from each other on the service execution platform 700. In this case, authentication information of the proxy 702 for each space may include access limit information (for example, the group ID of a user for which access is allowed or the user ID belonging to the group ID).

In the present embodiment, the external service manager 500 includes the node addition unit 55 as described above. The node addition unit 55 requests the visual programming tool 40 (for example, the flow editor 41) to add an invoke node corresponding to the added external service 701. Accordingly, at flow edition, the invoke node corresponding to the added external service 701 can be displayed on the flow editor GUI 201 in a selectable manner.

The following describes the present embodiment in detail. In the present embodiment, a single external service or a plurality of external services may correspond to one invoke node.

<Explanation of a System>

FIG. 1 is a block diagram illustrating an exemplary system configuration in the present embodiment.

A system illustrated in FIG. 1 includes the user terminal 100, the visual programming tool 40 (the flow editor 41 and the flow execution platform 200), the flow template manager 300, the flow repository manager 400, the external service manager 500, the service execution platforms 700 (for example, 700A and 700B), the service deployment managers 600 (for example, 600A and 600B), and network switches 800 (for example, 800A to 800D).

A user 101 causes the web browser operating on the user terminal 100 to display a flow editor GUI provided by the flow editor 41 of the visual programming tool 40, and develops a flow on the flow editor GUI. In addition, the user 101 operates the user terminal 100 to acquire flow data (data indicating the flow) from the flow template manager 300, and causes the flow editor 41 to download the flow data (onto the flow editor GUI). In addition, the user 101 can execute the flow indicated by the flow data by deploying the flow data downloaded to the flow editor 41 on the flow execution platform 200.

The visual programming tool 40 includes the flow editor 41 configured to provide the flow editor GUI for writing a flow, and the flow execution platform 200 for executing processing defined by the flow. The flow editor 41 has a function to manage nodes, and can execute node addition or deletion through the function. Node-RED described above is an exemplary visual programming tool 40. Details of the flow editor GUI and the function will be described later.

The flow template manager 300 has a function to provide a flow template manager GUI, a function to manage a flow template, and a function to request deployment or undeployment of an external service. Details of the flow template manager GUI and the functions of the flow template manager 300 will be described later.

The flow repository manager 400 has a function to manage the version of a flow. The user 101 can register, to the flow repository manager 400, flow data downloaded from the flow template manager 300. Examples of the flow repository manager include GitLab (https://gitlab.com/). The user 101 can register data obtained by customizing a flow as needed, and data before the customization to the flow repository manager 400.

The external service manager 500 has a function to request the service deployment manager 600 to deploy or undeploy an external service. Details of the function of the external service manager 500 will be described later.

The service deployment manager 600 has a function to execute deployment and undeployment of an external service on the service execution platform 700, and a function to execute deployment and undeployment of a proxy to which an end point as an access source to the external service is set. Examples of the service deployment manager 600 include Helm (https://www.helm.sh/). Details of the service deployment manager 600 will be described later.

The service execution platform 700 has a function to execute instances of an external service and a proxy. The service execution platform 700A or the service execution platform 700B receives at least one of an external-service deployment request, an external service undeployment request, a proxy deployment request, a proxy undeployment request, and a proxy set request from the service deployment manager 600A or the service deployment manager 600B, respectively, and executes the received request. In the present embodiment, the external-service deployment request, the proxy deployment request, and the proxy set request correspond to exemplary second deployment requests, and the external service undeployment request and the proxy undeployment request correspond to exemplary individual undeployment requests. Examples of the service execution platform 700 include Kubernetes (https://kubernetes.io/).

Among the network switches 800A to 800D, the network switches 800B and 800C may be switches in a local network (for example, a local area network (LAN)). The network switch 800D may be a switch in a remote network (for example, a wide area network (WAN)).

<Explanation of Screens>

Figure 2:
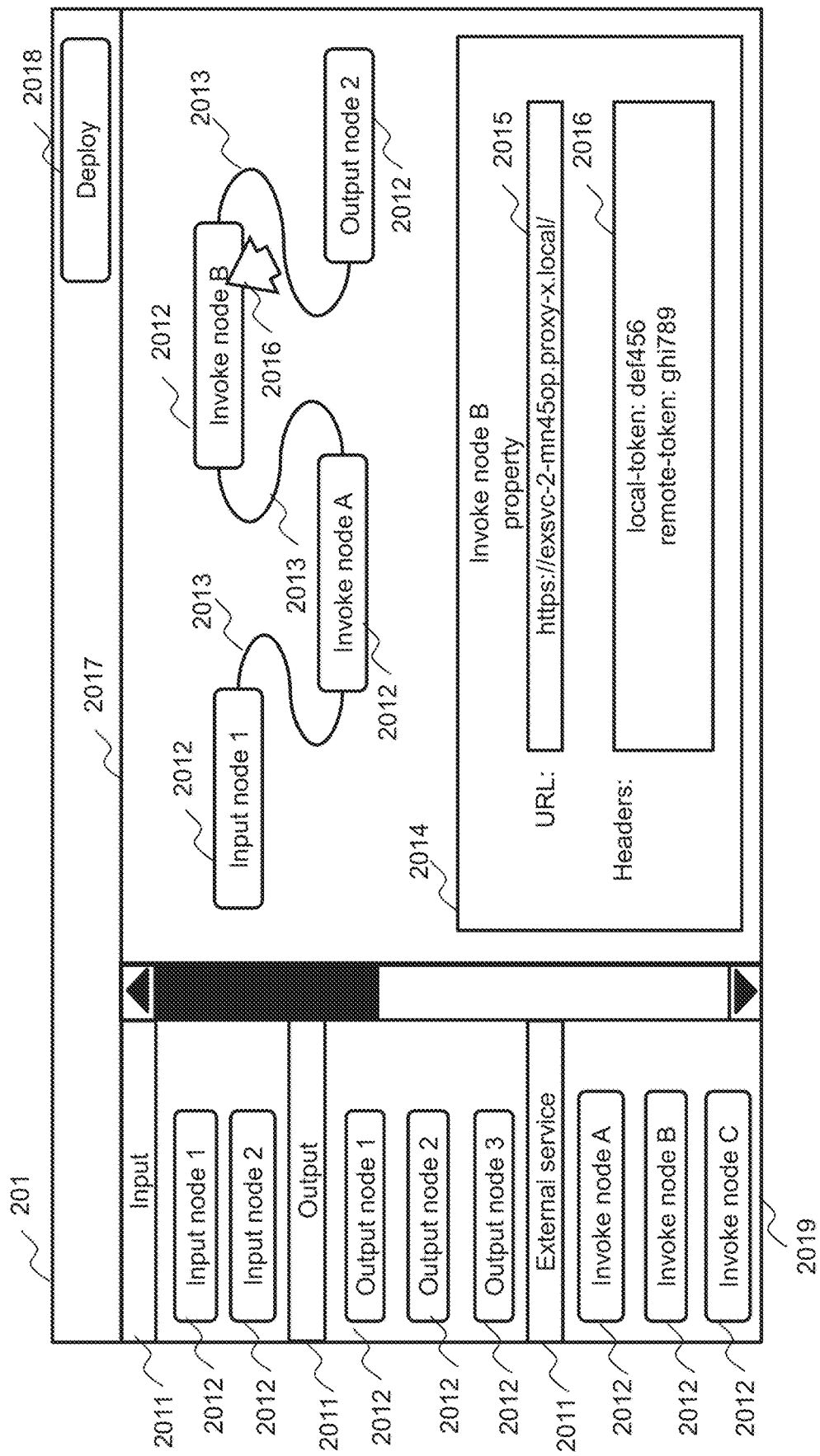
FIG. 2 is a diagram illustrating an exemplary flow editor GUI.

FIG. 2 is a diagram illustrating an exemplary flow editor GUI 201.

The flow editor GUI 201 includes a pallet area 2019 in which a list of selectable nodes is displayed, and an edition area 2017 in which flow edition is received.

The user 101 develops a flow in the edition area 2017 of the flow editor GUI 201.

The user 101 can drag and drop a node 2012 in the flow from the pallet area 2019 to the edition area 2017 so that the node becomes usable (editable) on the edition area 2017. The user 101 can define a node processing request by performing a mouse operation, a touch operation, or the like to connect the nodes 2012 with each other through a line 2013. When processing at a certain node 2012 ends, processing at another node 2012 connected with the certain node 2012 through the line 2013 starting at the certain node 2012 is subsequently executed.

When the user 101 double-clicks a node 2012, a node property set screen 2014 on which the property of the node 2012 is set opens. The node property set screen 2014 allows setting of a property value necessary for processing at the node 2012. For example, a URL as the end point of an external service can be set through a user interface (UI) 2015 of the screen 2014 to the property of the invoke node B for invoking the external service, and a header that sets authentication token information of the external service can be set through a UI 2016 of the screen 2014. In the present embodiment, a "UI" of a GUI is a GUI component such as a text box or a pull-down menu. According to the present embodiment, as described above, a URL as an exemplary invocation destination end point and a header as exemplary authentication information are already set to the property of an invoke node in flow data downloaded to the flow editor 41.

In the present embodiment, a node 2012 is dynamically added to the pallet area 2019. Specifically, as described above, when dynamic addition of an external service is detected by the external service manager 500, the external service manager 500 requests the visual programming tool 40 to add an invoke node corresponding to the external service. In response to the request, the invoke node as the target of the request is added by the visual programming tool 40, and the added invoke node is displayed in the pallet area 2019. The user 101 may be able to dynamically add the node 2012 in the pallet area 2019. Text 2011 indicating the type of the node may be displayed in the pallet area 2019.

FIGS. 3A, 3B, 3C, 3D, and 3E are each a diagram illustrating an exemplary flow template manager GUI 301.

Figure 3A:
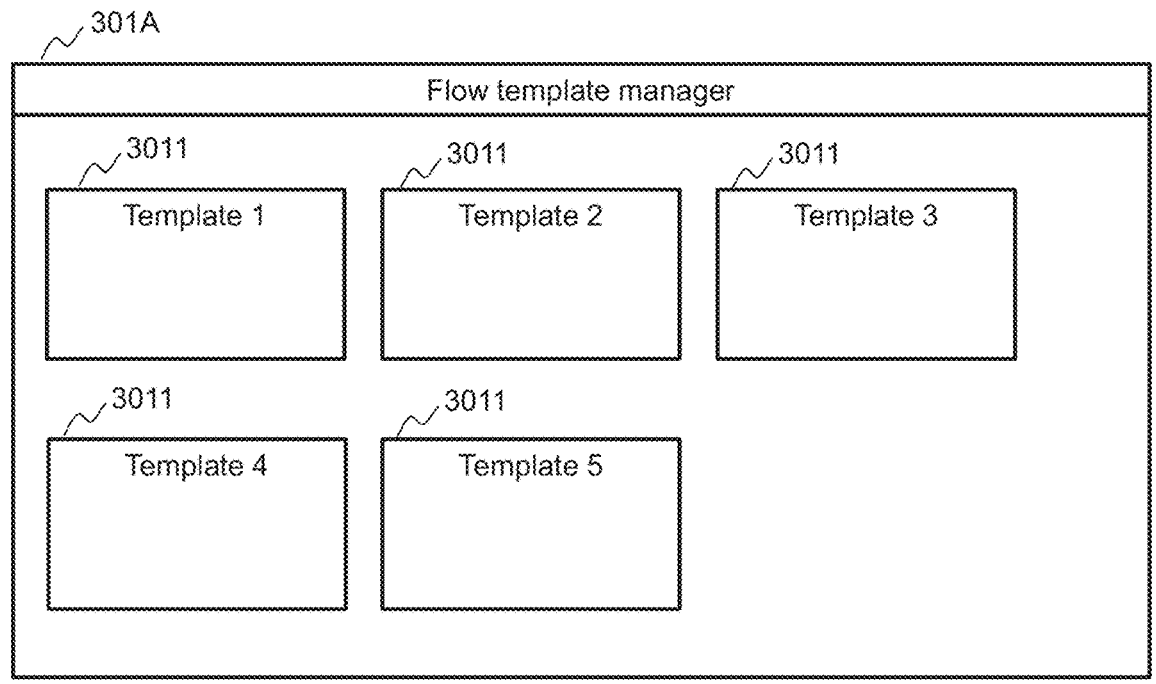
FIG. 3A is a diagram illustrating an exemplary flow template manager GUI.
Figure 3B:
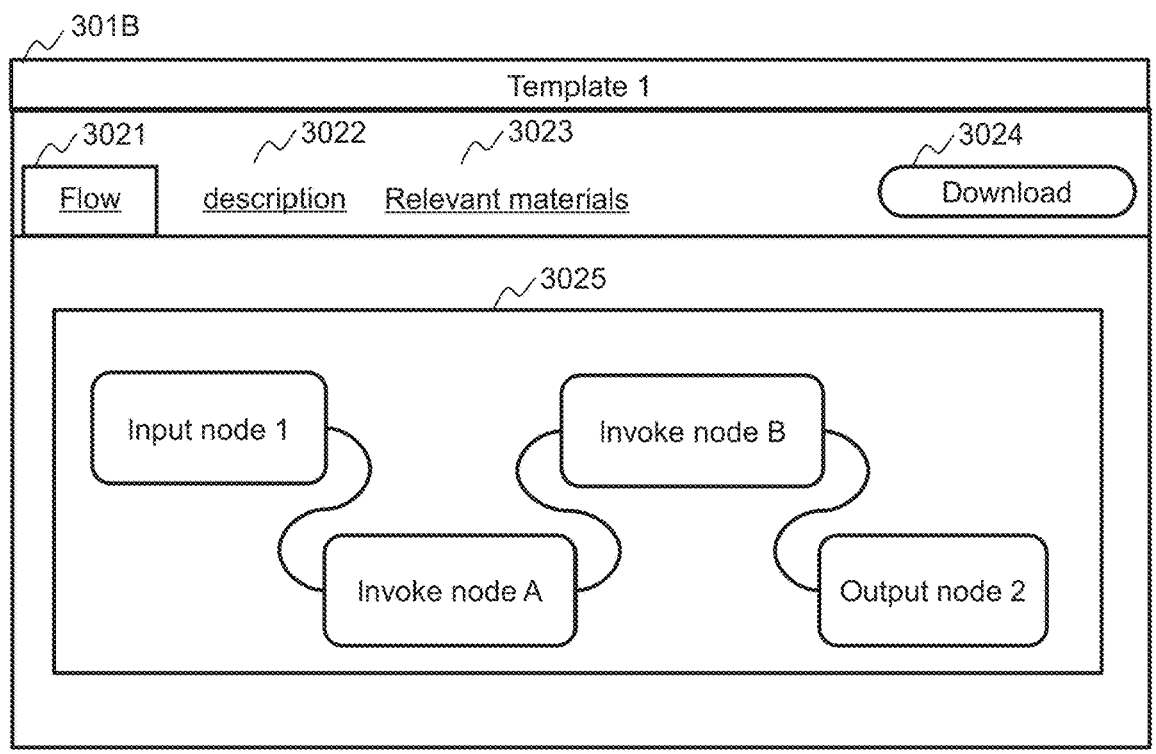
FIG. 3B is a diagram illustrating an exemplary flow template manager GUI.

A flow template manager GUI 301A exemplarily illustrated in FIG. 3A is an exemplary screen that displays a flow template list to receive, from the user, selection of a flow template desired by the user. When the user 101 clicks a flow template 3011 (for example, an icon indicating a flow template 1) on the GUI 301A, a flow template manager GUI 301B exemplarily illustrated in FIG. 3B opens. The click on the flow template 3011 is an exemplary flow template selection.

The flow template manager GUI 301B is an exemplary screen for receiving, from the user, an instruction to execute flow template information acquisition and flow data download. The user 101 can understand that a flow illustrated by a flow image 3025 displayed on the screen of a flow tab 3021 on the GUI 301B is a flow indicated by the selected flow template. In addition, the user 101 can acquire contents such as detail information and a document related to the selected flow template from a screen displayed upon selection of a description tab 3022 or selection of a relevant material tab 3023. When the user 101 clicks a download button 3024, a flow template manager GUI 301C exemplarily illustrated in FIG. 3C opens.

The flow template manager GUI 301C is an exemplary screen for specifying flow repository information as the download destination of flow data of the flow template, specifying flow editor information, and receiving an external-service deployment execution instruction from the user. The user 101 can use the GUI 301 to input (or browse) the URL of a flow repository, a project name, a user name, and a password through UIs 3031 to 3034 related to the flow repository manager 400, and to input (or browse), through UIs 3035 and 3036 related to the visual programming tool 40, the URL of the flow editor 41 and an access token as authorization for the flow template manager 300 to perform an operation to download flow data to the flow editor 41. When the user 101 clicks a deployment button 3037 for external-service deployment, a flow template manager GUI 301D exemplarily illustrated in FIG. 3D opens.

The flow template manager GUI 301D is an exemplary screen through which an execution instruction for external-service deployment is received. The user 101 can select a plan of an external service needed to execute the flow of the flow template through a flow template manager GUI 304. The "plan" means a combination of conditions on deployment of the external service, such as the deployment destination site of the external service and the API invocation limit (limit on the number of times of invocation of an external service API).

Figure 10:
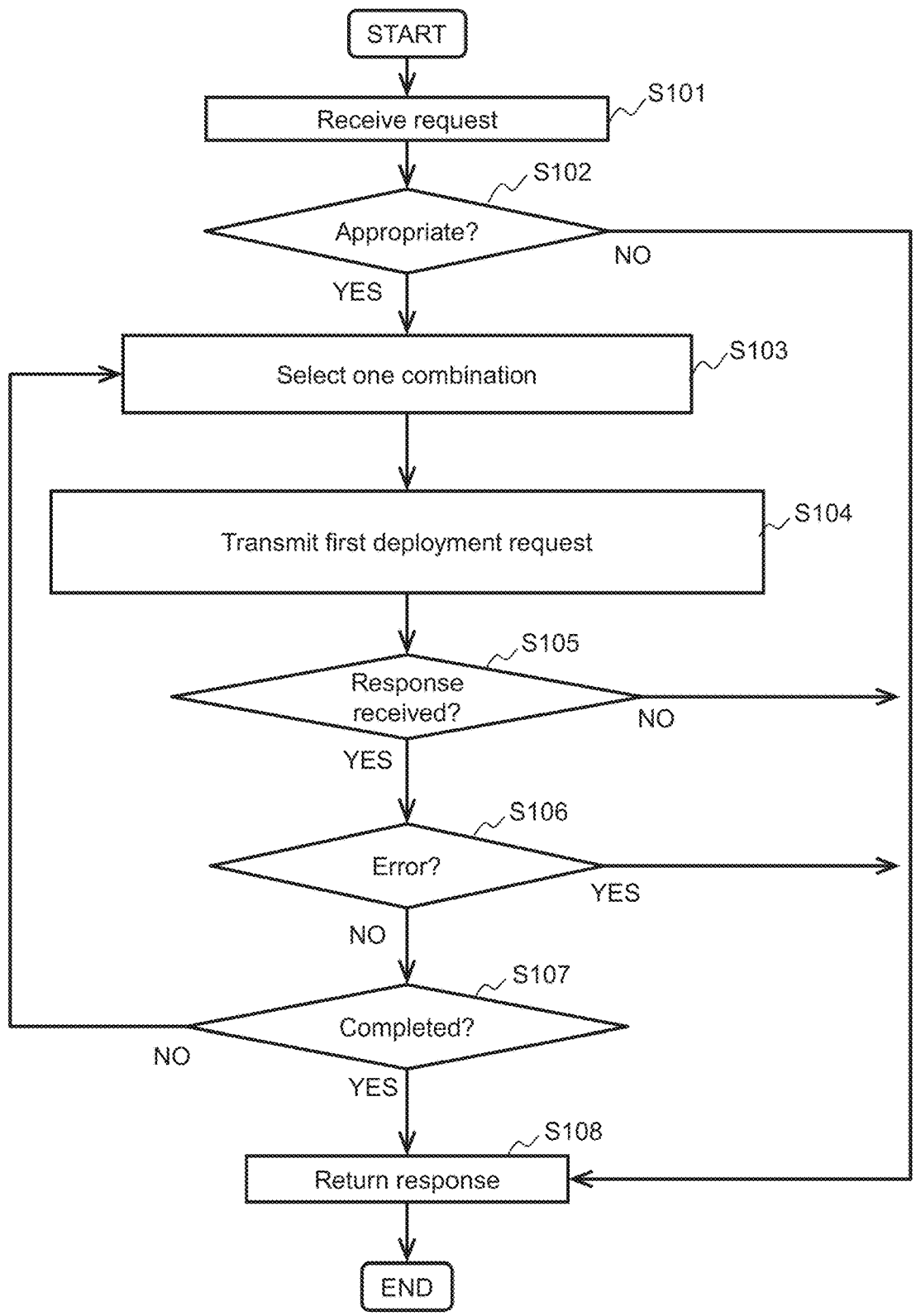
FIG. 10 is a diagram illustrating external-service deployment processing performed by a template management program.
Figure 11:
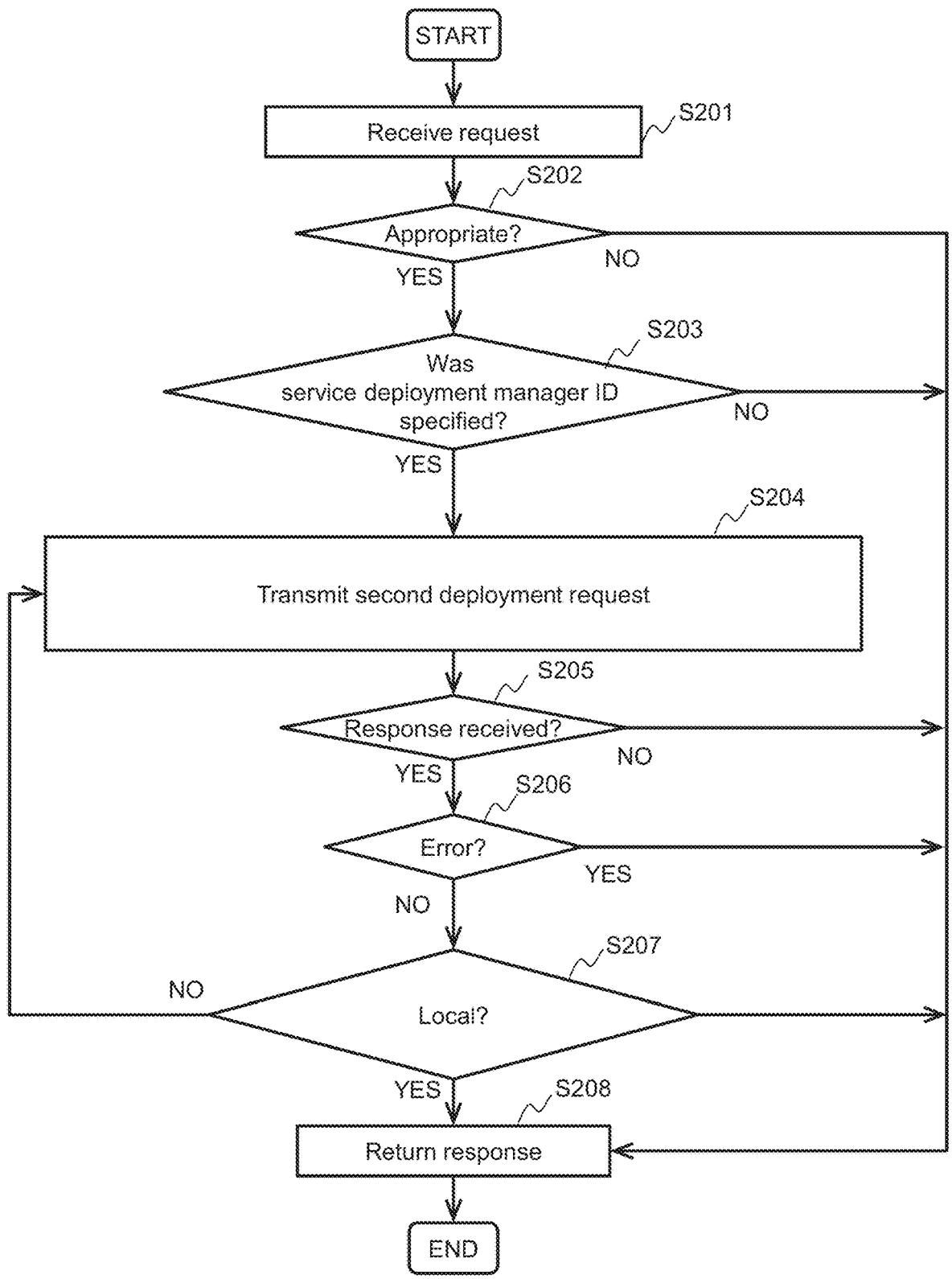
FIG. 11 is a diagram illustrating external-service deployment processing performed by an external-service management program.
Figure 12:
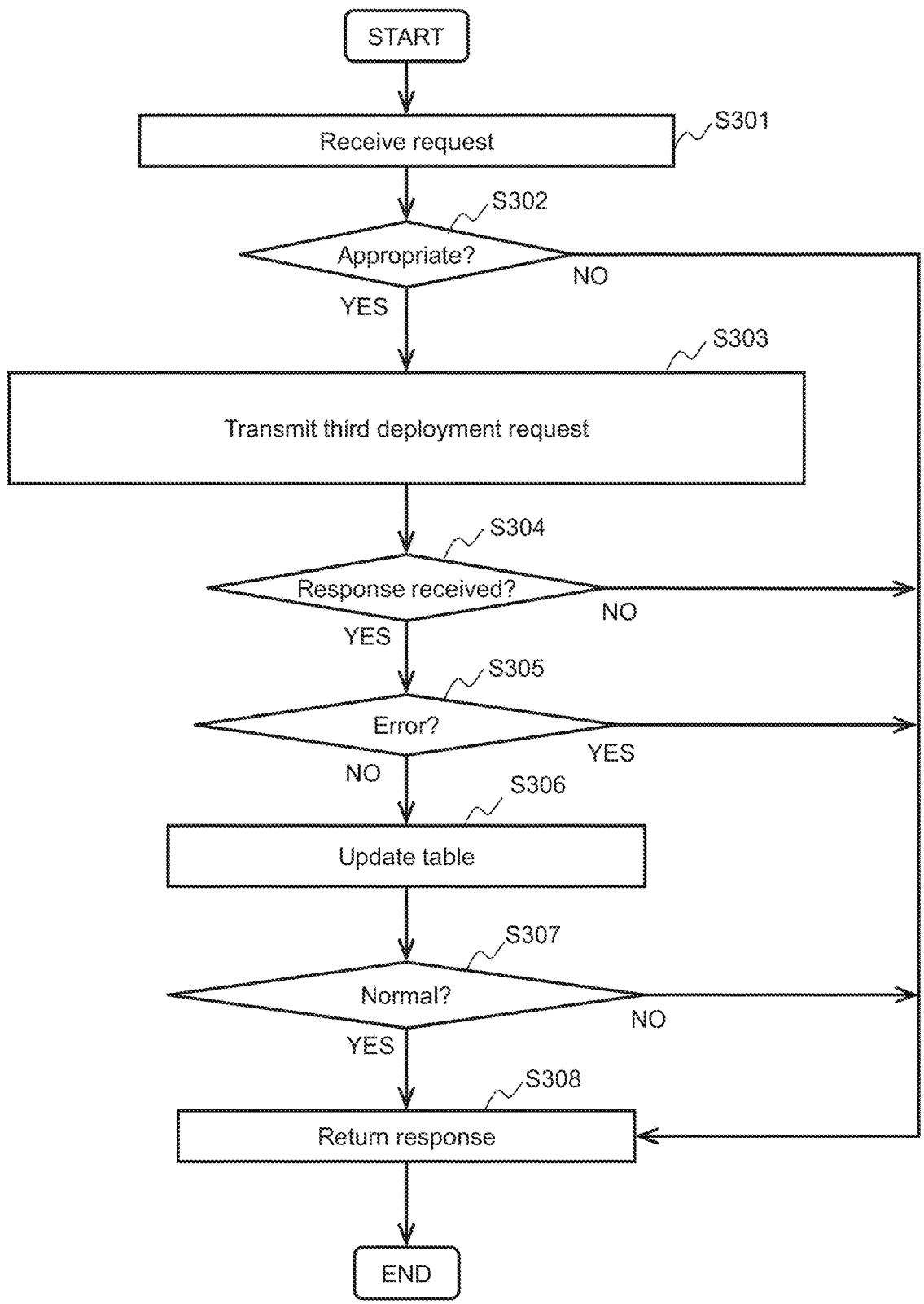
FIG. 12 is a diagram illustrating external-service deployment processing performed by a service deployment program.

The user 101 selects any of UIs 3041 and 3042 as radio buttons, selects a UI 3047 as a pull-down menu in accordance with the selected UI as appropriate, and thereafter clicks a deployment button 3048, thereby executing external-service deployment in the plan selected by the user 101. Accordingly, processes illustrated in FIGS. 10, 11, and 12 are sequentially executed. Details of each process will be described later.

When the user 101 clicks a download button 3038 on the GUI 301C exemplarily illustrated in FIG. 3C after external-service deployment is completed in response to a user operation on the GUI 301D, the flow template manager 300 sets the end point and authentication token information of the deployed external service to the property of each invoke node in the flow data indicated by the above-described selected flow template, and downloads the flow data to the flow editor 41, and as a result, a flow indicated by the flow data in which the end point and the authentication token information are already set is displayed in the edition area 2017 of the flow editor GUI 201. Accordingly, when the user 101 clicks a deployment button 2018 on the flow editor GUI 201 thereafter, the flow including external-service invocation processing can be executed without setting of the end point and the authentication token information to the property of each invoke node by the user 101.

Figure 3E:
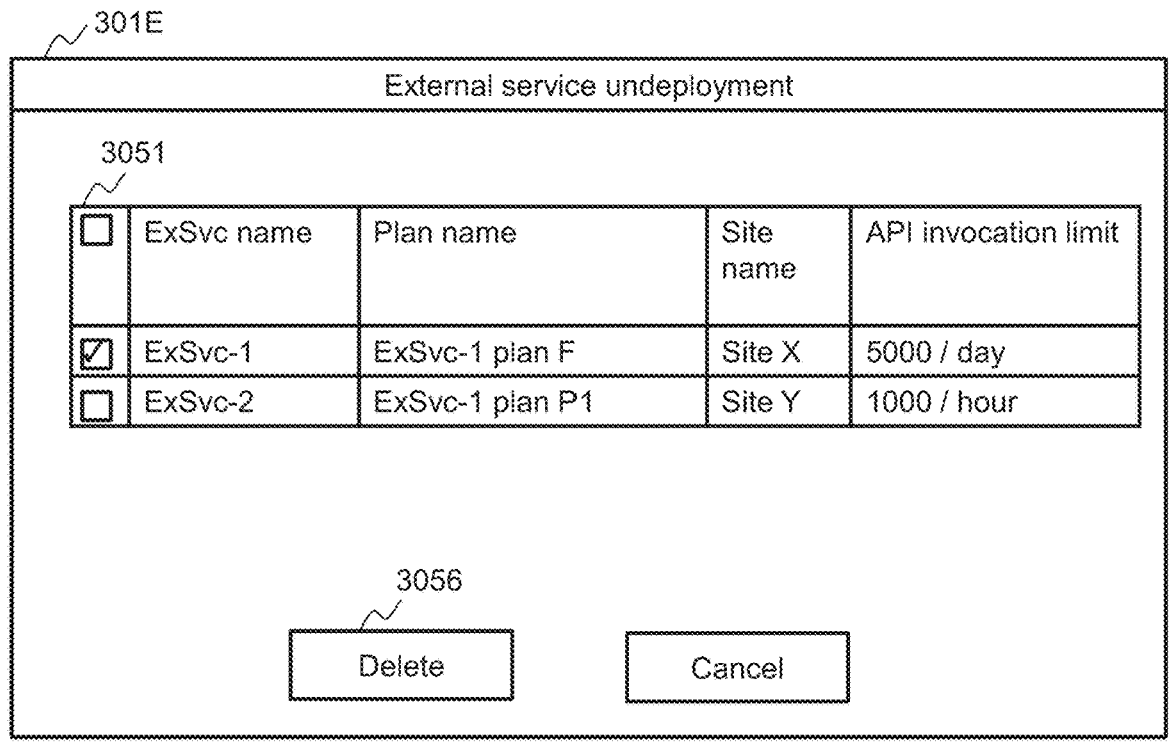
FIG. 3E is a diagram illustrating an exemplary flow template manager GUI.
Figure 14:
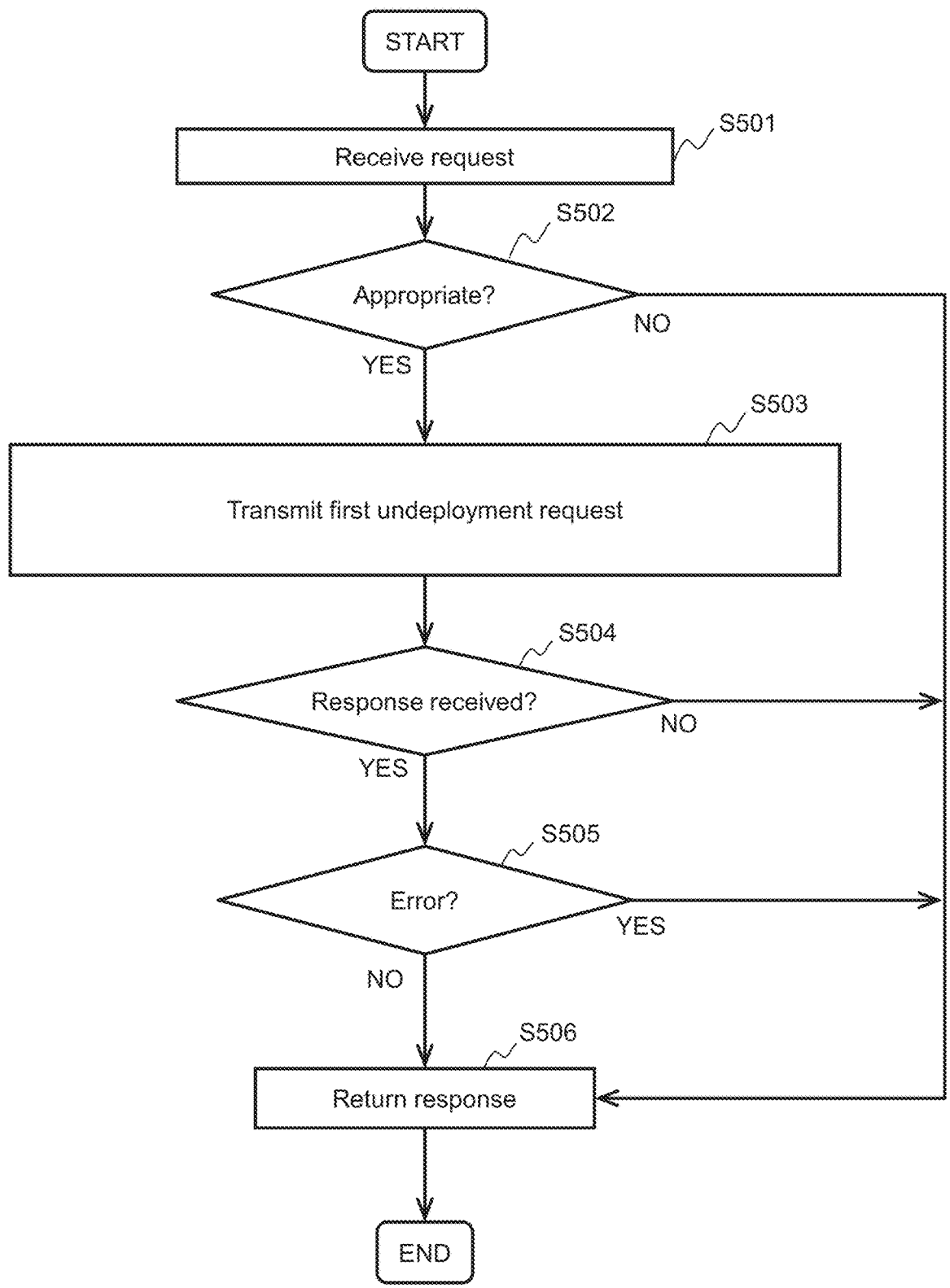
FIG. 14 is a diagram illustrating external-service undeployment processing performed by the template management program.
Figure 15:
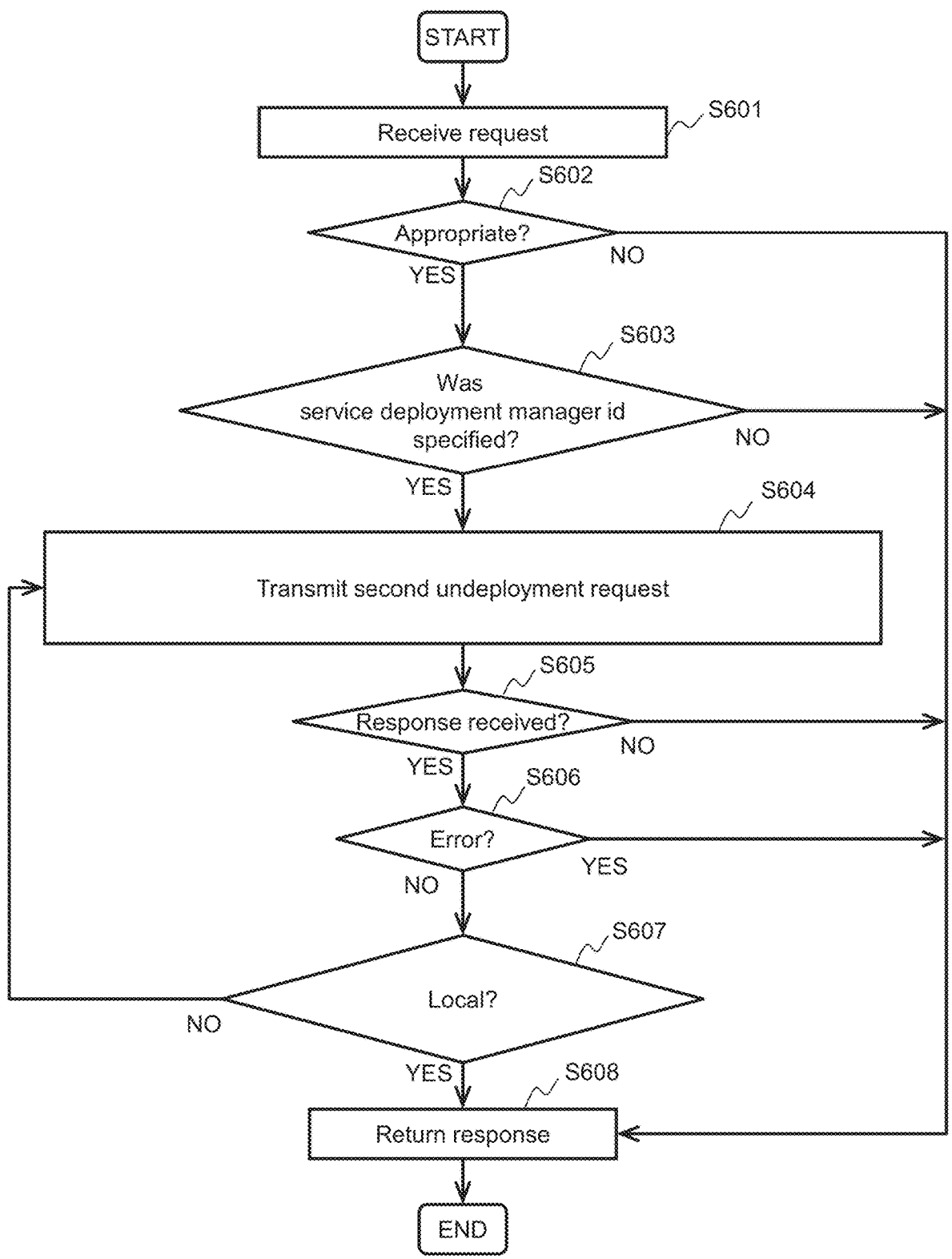
FIG. 15 is a diagram illustrating external-service undeployment processing performed by the external-service management program.
Figure 16:
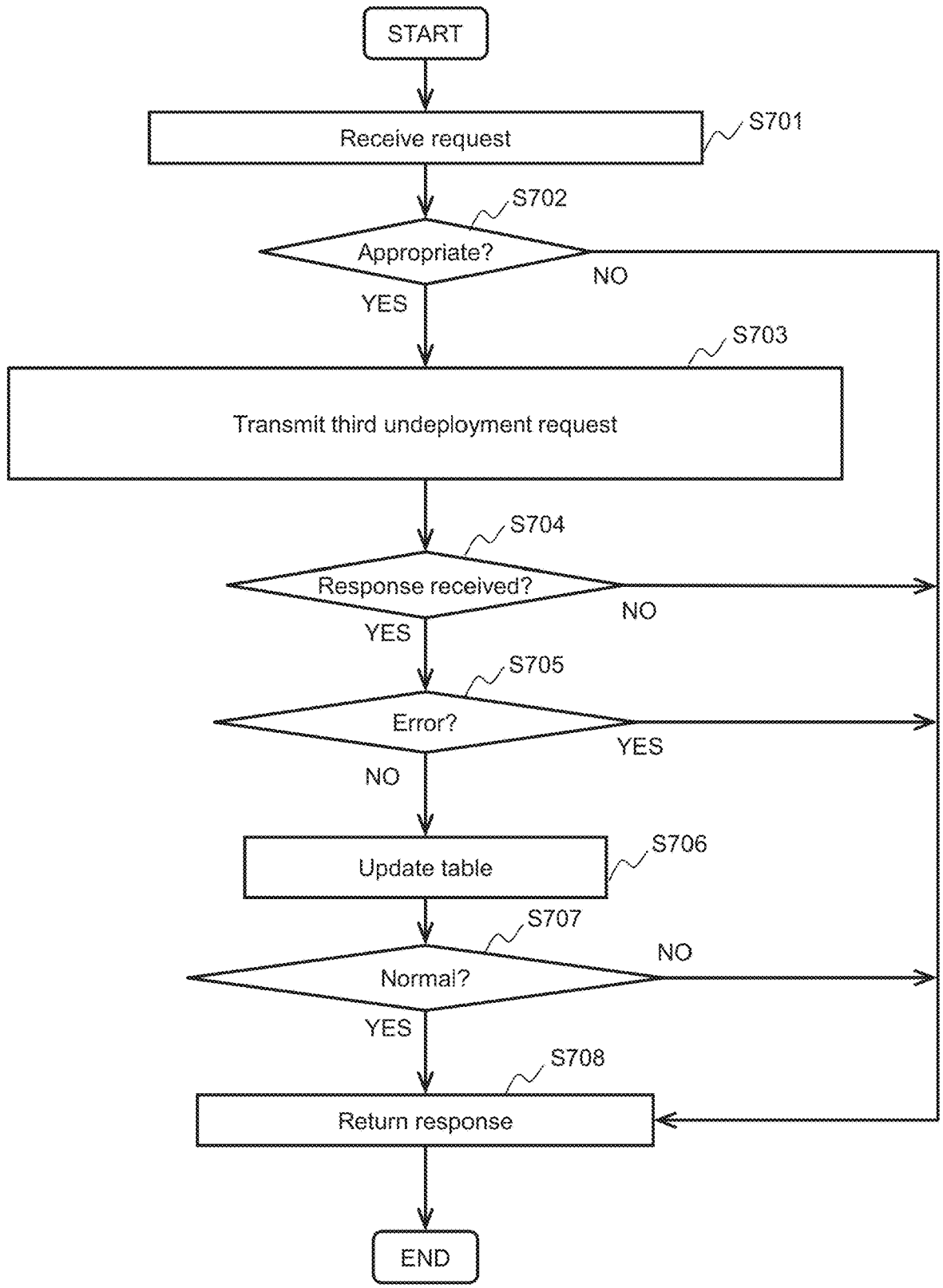
FIG. 16 is a diagram illustrating external-service undeployment processing performed by the service deployment program.

A flow template manager GUI 301E exemplarily illustrated in FIG. 3E is an exemplary screen displaying a list of deployed external services. The flow template manager GUI 301E displays information of an external service, deployment execution of which is instructed by the user 101 through the GUI 301D. When checking a desired UI (check box) 3051 and clicking a delete button 3056 on the GUI 301E, the user 101 can execute undeployment of the corresponding external service. Accordingly, the processes illustrated in FIGS. 14, 15, and 16 are sequentially executed. Details of each process will be described later.

<Explanation of a Computer>

Figure 4:
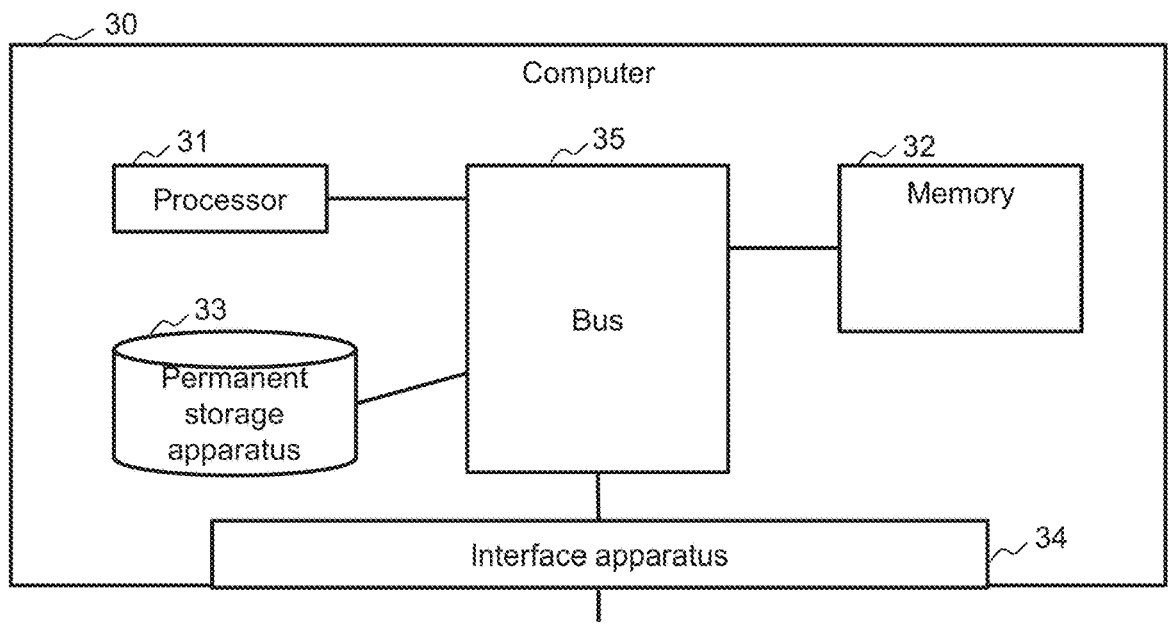
FIG. 4 is a block diagram illustrating an exemplary computer.

FIG. 4 is a block diagram illustrating an exemplary configuration of a computer.

At least one of the visual programming tool 40, the flow template manager 300, the flow repository manager 400, the external service manager 500, the service deployment manager 600, and the service execution platform 700 can be achieved on one or more computers 30.

Each computer 30 includes a processor 31, a memory 32, a permanent storage apparatus 33, an interface apparatus 34, and a bus 35 coupling these components.

The processor 31 achieves a predetermined function by executing a computer program stored in the memory 32. The memory 32 stores the computer program executed by the processor 31 and data necessary for execution of the computer program. The computer program is loaded from the permanent storage apparatus 33 onto the memory 32. The interface apparatus 34 is coupled with any network switch 800. The computer 30 can perform communication with the other computers 30 through the interface apparatus 34.

Some computers 30 may be replaced with a virtual environment such as a virtual machine or a container.

<Explanation of Computer Programs and Data in Memories>

Figure 5A:
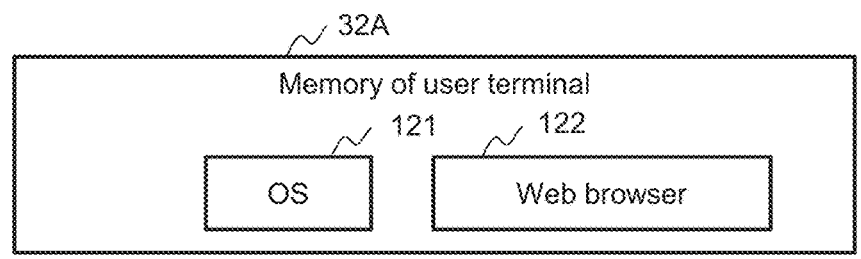
FIG. 5A is a diagram illustrating exemplary computer programs in a memory of a user terminal.

FIG. 5A is a diagram illustrating exemplary computer programs in a memory 32A of the user terminal 100.

The memory 32A includes (stores) an operating system (OS) 121 and a web browser 122.

Figure 5B:
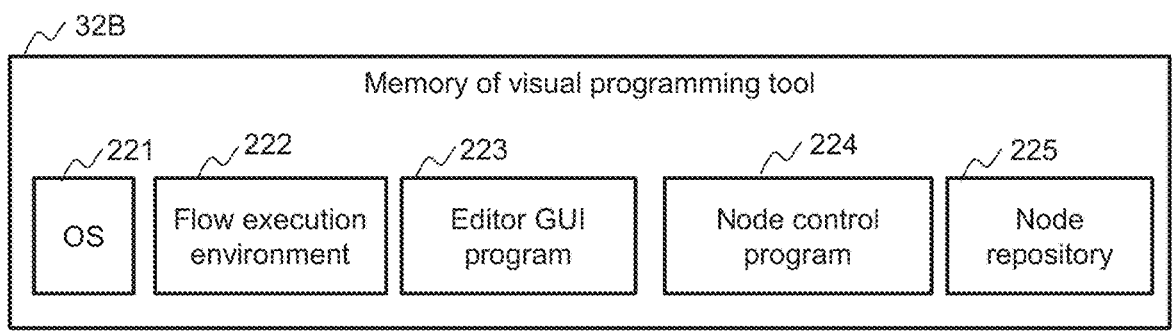
FIG. 5B is a diagram illustrating exemplary computer programs in a memory of a visual programming tool.

FIG. 5B is a diagram illustrating exemplary computer programs in a memory 32B of the visual programming tool 40.

The memory 32B includes an OS 211, a flow execution environment 222 configured to provide an execution environment of a flow, an editor GUI program 223 configured to provide the flow editor GUI, a node management program 224 configured to perform node addition to the pallet area of the flow editor GUI, and a node repository 225 configured to manage a node body (node original).

Figure 5C:
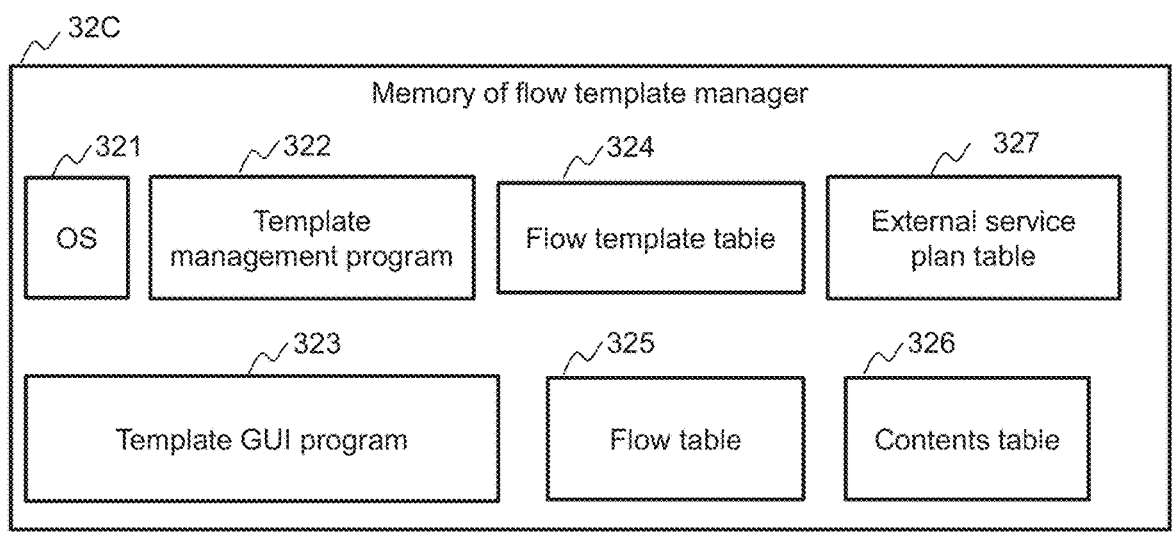
FIG. 5C is a diagram illustrating exemplary computer programs in a memory of a flow template manager.

FIG. 5C is a diagram illustrating exemplary computer programs and data in a memory 32C of the flow template manager 300.

The memory 32C includes an OS 321, a template management program 322 configured to manage a flow template, a template GUI program 323 configured to provide the flow template manager GUI, a flow template table 324, a flow table 325, a contents table 326, and an external service plan table 327.

Figure 5D:
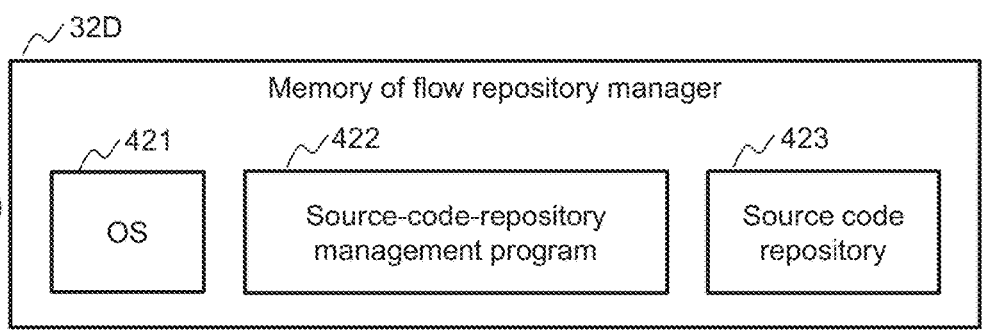
FIG. 5D is a diagram illustrating exemplary computer programs in a memory of a flow repository manager.

FIG. 5D is a diagram illustrating exemplary computer programs in a memory 32D of the flow repository manager 400.

The memory 32D includes an OS 412, a repository management program 422 configured to manage a source code repository, and a source code repository 423 in which a source code of flow data is stored.

Figure 6A:
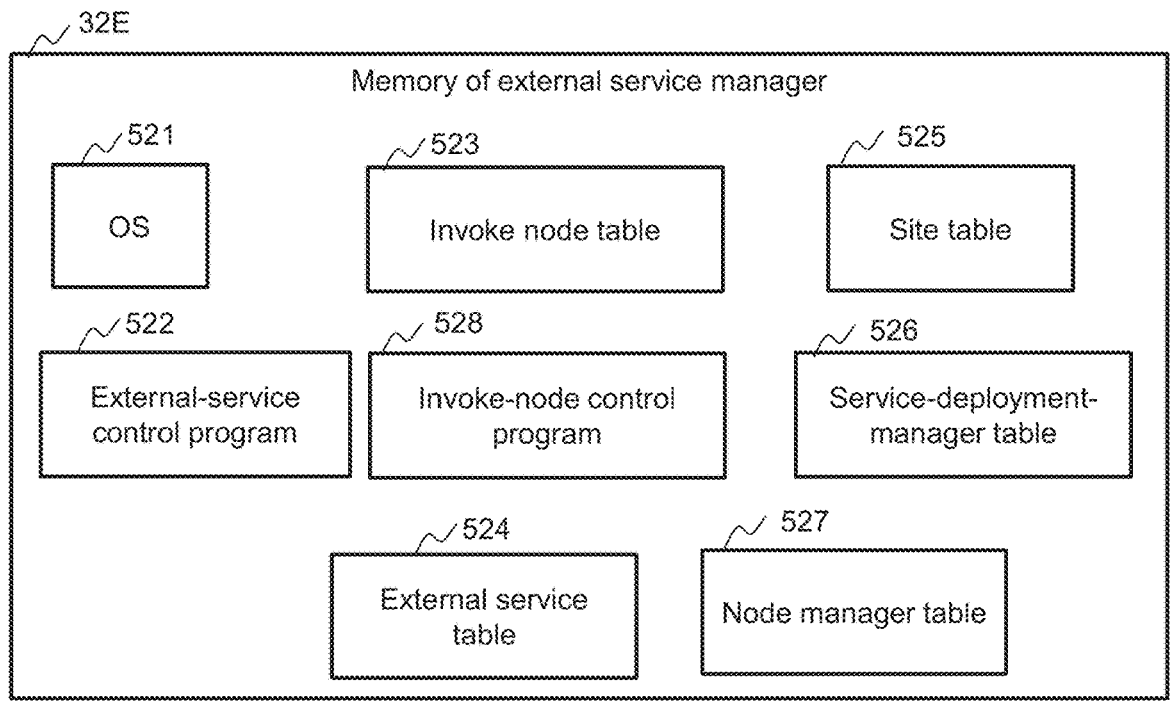
FIG. 6A is a diagram illustrating exemplary computer programs and data in a memory of an external service manager.

FIG. 6A is a diagram illustrating exemplary computer programs and data in a memory 32E of the external service manager 500.

The memory 32E includes an OS 521, an external-service management program 522, an invoke node table 523, an invoke-node management program 528, an external service table 524, a site table 526, a service-deployment-manager table 525, and a node manager table 527. For example, the above-described functions 51 to 55 are achieved when the external-service management program 522 and the invoke-node management program 528 are executed.

Figure 6B:
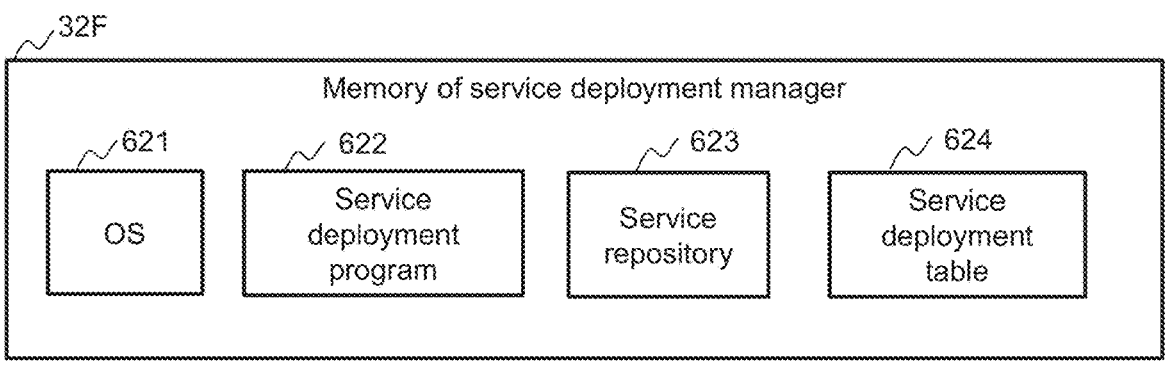
FIG. 6B is a diagram illustrating exemplary computer programs and data in a memory of a service deployment manager.

FIG. 6B is a diagram illustrating exemplary computer programs and data in a memory 32F of the service deployment manager 600.

The memory 32F includes an OS 621, a service deployment program 622, a service repository 623 configured to manage a program as an instance of a service, a service deployment table 624 configured to manage information of a service instance.

Figure 6C:
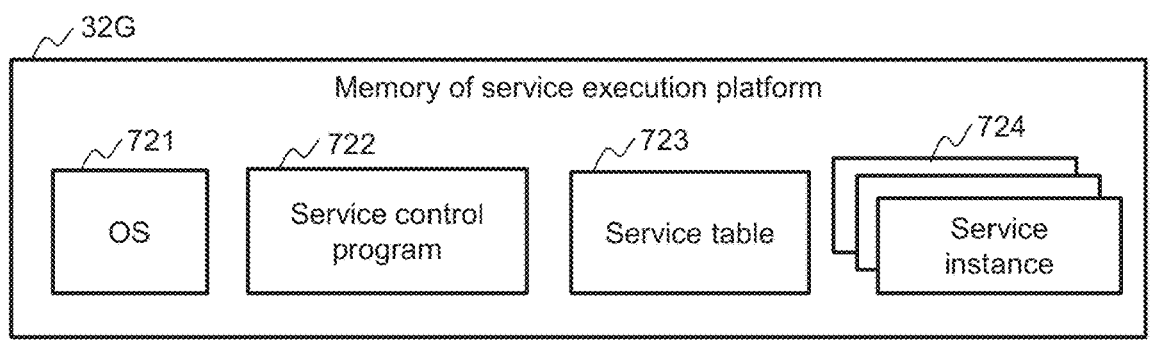
FIG. 6C is a diagram illustrating exemplary computer programs and data in a memory of a service execution platform.

FIG. 6C is a diagram illustrating exemplary computer programs and data in a memory 32G of the service execution platform 700.

The memory 32G includes an OS 721, a service management program 722 configured to manage deployment and undeployment of a service, a service table 723 configured to manage information of a service instance, and a service instance 724 as a deployed service.

<Explanation of Tables>

FIG. 7 is a diagram illustrating an exemplary configuration of a table held at the flow template manager 300.

The flow template table 324 manages information related to a flow template. For example, the flow template table 324 includes an entry for each flow template. In an example of one flow template (in the present paragraph, "target template"), the entry includes information such as a flow template ID 32401 indicating the flow template ID of the target template, a flow template name 32402 indicating the name of the target template, a flow ID 32403 indicating the flow ID of a flow indicated by the target template, an external service ID 32404 indicating the ID of one or a plurality of external services corresponding to one or a plurality of invoke nodes included in the flow indicated by the target template, and a contents ID 32405 indicating the ID of the contents of the target template.

The flow table 325 manages information related to flow data of each flow template. For example, the flow table 325 includes an entry for each flow. In an example of one flow (in the present paragraph, "target flow"), the entry includes information such as a flow ID 32501 indicating the ID of a flow, and a flow 32502 indicating the flow. The flow 32502 is, for example, text data indicating information of the flow data. Specifically, for example, the flow 32502 includes a node ID, information indicating a connection line between nodes, and information set to the property of a node.

The contents table 326 manages information related to contents such as description and relevant materials of each flow template. For example, the contents table 326 includes an entry for each content. In an example of a content (in the present paragraph, "target content"), the entry includes information such as a contents ID 32601 indicating the ID of the target content, and contents 32602 indicating the target content. The contents 32602 includes, for example, text data of description information, and information of access destinations of relevant materials.

The external service plan table 327 manages information related to a plan as a condition related to external-service deployment. For example, the external service plan table 327 includes an entry for each plan. In an example of one plan (in the present paragraph, "target plan"), the entry includes information such as a plan ID 32701 indicating the ID of the target plan, a plan 32702 indicating the name of the target plan, a charge-free flag 32703 indicating whether the target plan is free of charge, an external service ID 32704 indicating the ID of an external service belonging to the target plan, a site ID 32705 indicating the ID of a site at the deployment destination of the external service, and an invocation limit 32706 indicating an API invocation limit corresponding to the target plan. The invocation limit 32706 is information (API invocation limit information) expressed in the format of {API invocation number, duration}. A plan for which the invocation limit 32706 is not provided (blank) is a plan with no API invocation limit.

FIG. 8 is a diagram illustrating an exemplary configuration of a table held at the external service manager 500.

The invoke node table 523 manages information related to a combination of an invoke node and an external service as the invocation destination thereof. For example, the invoke node table 523 includes an entry for each invoke node. In an example of one invoke node (in the present paragraph, "target invoke node"), the entry includes information such as an invoke node ID 52301 indicating the ID of the target invoke node, and an external service ID 52302 indicating the ID of an external service as the invocation destination of the target invoke node.

The external service table 524 manages a combination of an external service and the site 80 at which the external service can be deployed. For example, the external service table 524 includes an entry for each external service. In an example of one external service (in the present paragraph, "target external service"), the entry includes information such as an external service ID 52401 indicating the ID of the target external service, an external service name 52402 indicating the name of the target external service, and a site ID 52403 indicating the ID of one or more sites 80 that can be the deployment destination of the target external service.

The service-deployment-manager table 525 manages information related to the service deployment manager 600. The service-deployment-manager table 525 includes an entry for each service deployment manager 600. In an example of one service deployment manager 600 (in the present paragraph, "target manager 600"), the entry includes information such as a service deployment manager ID 52501 indicating the ID of the target manager 600, an end point 52502 indicating the access destination end point of the target manager 600, and a site ID 52503 indicating the ID of the site 80 at which the target manager 600 exists.

The site table 526 manages information related to the site 80. For example, the site table 526 includes an entry for each site 80. In an example of one site 80 (in the present paragraph, "target site 80"), the entry includes information such as a site ID 52601 indicating the ID of the target site 80, a site name 52602 indicating the name of the target site, and a local flag 52603 indicating whether the target site is the local site 80L. As described above, the local site 80L indicates a site at which the visual programming tool 40 exists.

The node manager table 527 manages information related to the node management program 224. For example, the node manager table 527 includes information such as an end point 52701 indicating the access destination end point of the node management program 224.

According to the tables 523 to 525 illustrated in FIG. 8, for each of one or a plurality of sites 80, the service deployment manager 600 corresponding to the site 80 is associated with the site ID of the site 80, and the external service ID corresponding to the site ID.

Figure 9A:
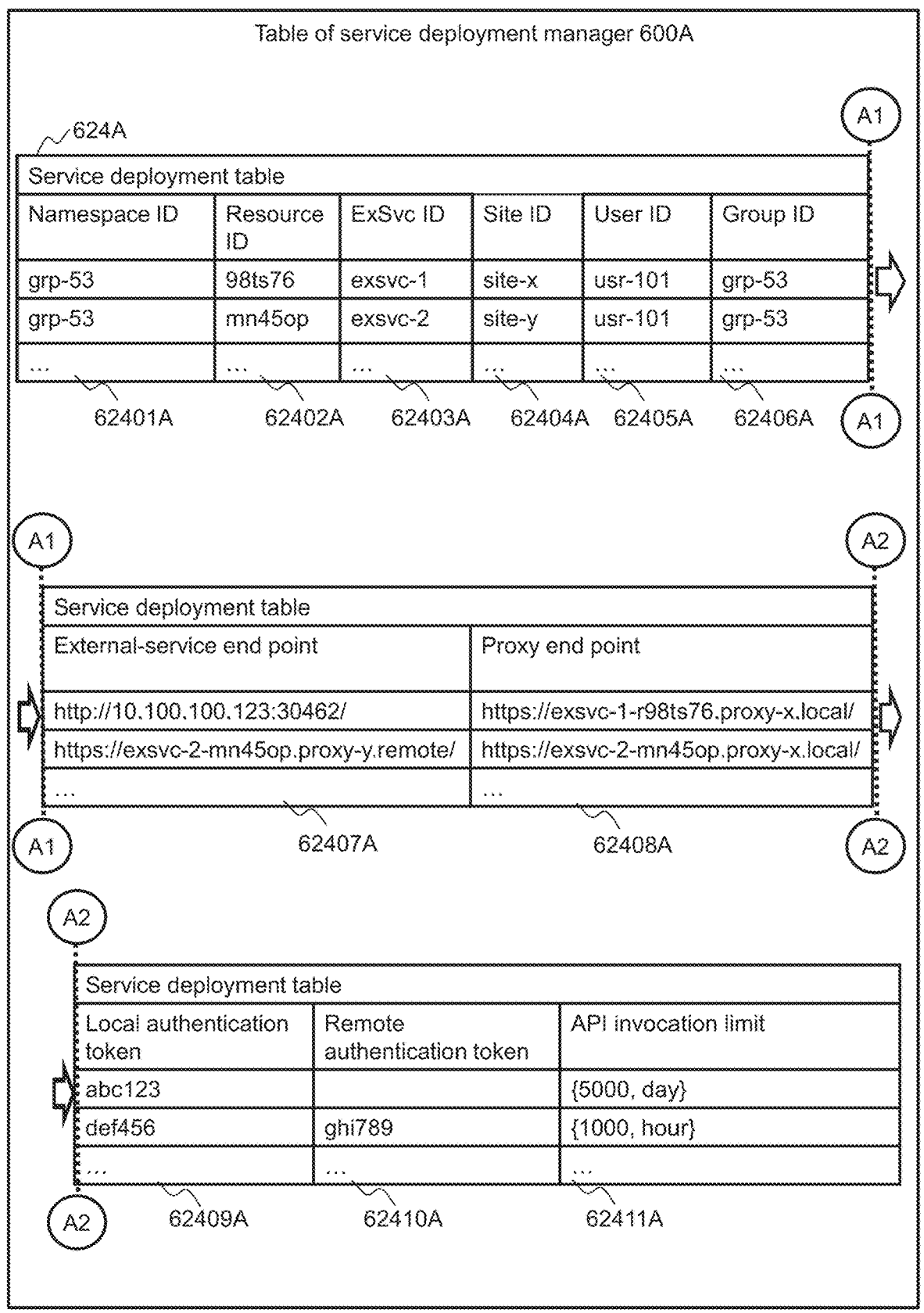
FIG. 9A is a diagram illustrating an exemplary configuration of a table held at a service deployment manager corresponding to a local site.
Figure 9B:
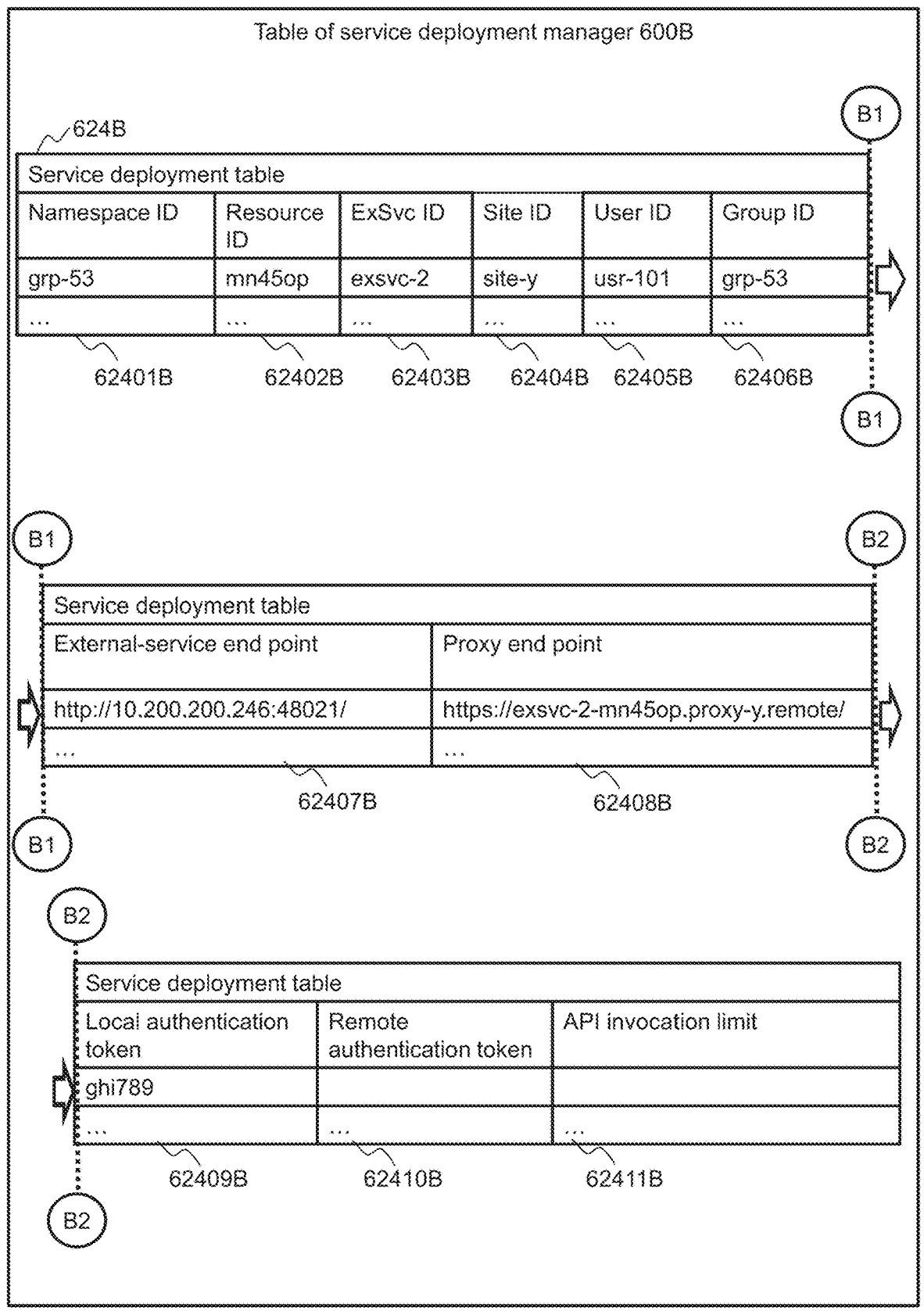
FIG. 9B is a diagram illustrating an exemplary configuration of a table held at a service deployment manager corresponding to a remote site.

FIG. 9A is a diagram illustrating an exemplary configuration of a table held at the service deployment manager 600A. FIG. 9B is a diagram illustrating an exemplary configuration of a table held at the service deployment manager 600B.

The service deployment table 624 manages information related to a deployed external service and a deployed proxy. For example, the service deployment table 624 includes an entry for each external service. In an example of one flow template (in the present paragraph, "target template"), the entry includes information such as a namespace ID 62401 indicating the ID of a namespace at the deployment destination of the target external service, a resource ID 62402 indicating the ID of an instance of the target external service, an external service ID 62403 indicating the ID of the target external service, a site ID 62404 indicating the ID of the site 80 as the deployment destination of the target external service, a user ID 62405 indicating the ID of the user of the target external service, a group ID 62406 indicating the ID of a group to which the user of the target external service belongs, an external-service end point 62407 indicating the end point of the target external service, a proxy end point 62408 indicating the end point of the proxy of the target external service, a local authentication token 62409 indicating an authentication token of a proxy related to the target external service and deployed at the local site 80L, a remote authentication token 62410 indicating an authentication token of a proxy related to the target external service and deployed at the remote site 80R, and an invocation limit 62412 indicating the API invocation limit of the target external service.

According to FIGS. 9A and 9B, the service deployment tables 624A and 624B each include an entry corresponding to an external service, the deployment destination of which is a remote site (refer to the external service ID "exsvc-2"). Specifically, when the external service is the external service 701B exemplarily illustrated in FIG. 17, the service deployment table 624B includes an entry having information related to the external service 701B and the proxy 702B1 deployed at the remote site 80R (the table 624B includes the local authentication token 62409B for the external service, but this is because the site 80R is local for the site 80R). The service deployment table 624A includes an entry having information related to the proxy 702B2 deployed at the local site 80L (for the proxy 702B2, the external-service end point 62407A indicating the end point of the proxy 702B1 (external service for the proxy 702B2) that performs communication with the proxy 702B2).

<Explanation of External-Service Deployment Processing>

FIG. 10 is a diagram illustrating exemplary external-service deployment processing performed by the template management program 322 of the flow template manager 300.

First at step S101, the template management program 322 receives, from the template GUI program 323, a request to deploy an external service. The request is transmitted from the template GUI program 323 when flow data of a flow indicated by a flow template desired by the user is downloaded from the flow template manager 300 to the flow editor 41 of the visual programming tool 40 in response to selection of the flow template through the template GUI program 323. An argument associated with the request includes an array of combinations of the external service ID, the site ID, and the API invocation limit, and the group ID and the user ID for each combination.

Subsequently at step S102, the template management program 322 determines whether the request argument received at step S101 is appropriate. Specifically, for example, the template management program 322 determines that the argument is appropriate when the array of combinations of the external service ID, the site ID, and the API invocation limit is specified as the request argument. When the argument is appropriate, the processing proceeds to step S103. When the argument is not appropriate, the processing proceeds to step S108, and the template management program 322 returns a response including error information to the template GUI program 323 and ends the processing.

Subsequently at step S103, the template management program 322 selects one of combinations of the external service ID, the site ID, and the API invocation limit from the array of the request argument received at step S101.

Subsequently at step S104, the template management program 322 transmits a first deployment request to the external-service management program 522 of the external service manager 500. The combination of the external service ID, the site ID, and the API invocation limit selected at step S103 is specified as the request argument. In addition, the group ID and the user ID corresponding to the combination selected at step S103 are specified as the request argument. After transmission of the request, the template management program 322 waits for a first deployment response corresponding to the request for a predetermined time-out duration.

Subsequently at step S105, the template management program 322 checks whether the first deployment response has been received in the time-out duration. When the response has been received in the time-out duration, the processing proceeds to step S106. When no response has been received in the time-out duration, the processing proceeds to step S108, and the template management program 322 returns a response including error information to the template GUI program 323 and ends the processing.

Subsequently at step S106, the template management program 322 checks the content of the first deployment response from the external-service management program 522, and checks whether error exists in the first deployment request. When no error exists, the processing proceeds to step S107. When error exists, the template management program 322 returns a response including error information to the template GUI program 323 and ends the processing.

Subsequently at step S107, the template management program 322 checks whether an argument to be selected exists the array of the request argument received at step S101. When an argument to be selected exists, the processing returns to step S103. When no argument to be selected exists, the processing proceeds to step S108.

Subsequently at step S108, the template management program 322 returns a result indicating completion of the external-service deployment processing to the template GUI program 323, and ends the processing. At step 108, the template management program 322 sets, to the property of each of one or more invoke nodes, an invocation destination end point obtained from the first deployment response for an external service corresponding to the invoke node, and accordingly, flow data of a flow in which the invocation destination end point is set to the property of each of the one or more invoke nodes is downloaded to the flow editor 41 of the visual programming tool 40.

FIG. 11 is a diagram illustrating exemplary external-service deployment processing performed by the external-service management program 522 of the external service manager 500.

First at step S201, the external-service management program 522 receives the first deployment request from the template management program 322.

Subsequently at step S202, the external-service management program 522 determines whether the request argument received at step S201 is appropriate. Specifically, the external-service management program 522 determines that the argument is appropriate when the external service ID, the site ID, and the API invocation limit are specified in the argument. When the argument is appropriate, the processing proceeds to step S203. When the argument is not appropriate, the processing proceeds to step S211, and the external-service management program 522 returns the first deployment response including error information to the template management program 322, and ends the processing.

Subsequently at step S203, the external-service management program 522 specifies the service deployment manager ID 52501 from the service-deployment-manager table 526 by using, as a key, the site ID as the request argument received at step S201. When the service deployment manager ID 52501 is specified, the processing proceeds to step S204. When the service deployment manager ID 52501 cannot be specified, the processing proceeds to step S210, and the external-service management program 522 returns the first deployment response including error information to the template management program 322, and ends the processing.

Subsequently at step S204, the external-service management program 522 transmits a second deployment request to the service deployment program 622 of the service deployment manager 600A or 600B of the specified service deployment manager ID 52501. An argument associated with the second deployment request includes the external service ID, the API invocation limit, the group ID, and the user ID as the request argument received at step S201. After transmission of the second deployment request, the external-service management program 522 waits for a response (second deployment response) to the request for a predetermined time-out duration.

Subsequently at step S205, the external-service management program 522 checks whether the second deployment response has been received in the time-out duration. When the response has been received in the time-out duration, the processing proceeds to step S206. When no response has been received in the time-out duration, the processing proceeds to step S108, and the external-service management program 522 returns the first deployment response including error information to the template management program 322, and ends the processing.

Subsequently at step S206, the external-service management program 522 checks the content of the second deployment response from the service deployment program 622, and checks whether error exists in the second deployment request. When no error exists, the processing proceeds to step S207. When error exists, the processing proceeds to step S210, and the external-service management program 522 returns the first deployment response including error information to the template management program 322, and ends the processing.

Subsequently at step S207, the external-service management program 522 refers to the site table 526 and checks whether the local flag 52603 corresponding to the site ID in the request argument received at step S201 is "true" (in other words, whether the deployment destination is local). When the deployment destination is local, the processing proceeds to step S208. When the deployment destination is not local, the processing returns to step S204. This is to deploy, at the local site 80L, a proxy that performs communication with a proxy deployed at the remote site 80R.

Subsequently at step S208, the external-service management program 522 returns the first deployment response as a result of completion of the external-service deployment processing to the template management program 322, and ends the processing. The first deployment response is associated with the end point and the authentication token information of a proxy deployed in accordance with the second deployment request, as an invocation destination end point and authentication token information corresponding to the external service ID as the argument of the first deployment request (the end point and the authentication token information are set to the property of an invoke node corresponding to the external service ID by the flow template manager 300). The end point and the authentication token information of the proxy are associated with the second deployment response to the second deployment request.

FIG. 12 is a diagram illustrating exemplary external-service deployment processing performed by the service deployment program 622 of the service deployment manager 600.

First at step S301, the service deployment program 622 receives the second deployment request from the external-service management program 522.

Subsequently at step S302, the service deployment program 622 determines whether the request argument received at step S301 is appropriate. Specifically, the service deployment program 622 determines that the argument is appropriate when the external service ID, the group ID, and the API invocation limit are specified in the argument. When the argument is appropriate, the processing proceeds to step S303. When the argument is not appropriate, the processing proceeds to step S308, and the service deployment program 622 returns the second deployment response including error information to the external-service management program 522, and ends the processing.

Subsequently at step S303, the service deployment program 622 transmits a third external-service deployment request to the service management program 722 of the service execution platform 700. The request is associated with the external service ID, the namespace ID (value same as the group ID), and the API invocation limit as the argument. Among an external service and a proxy thereof, at least the proxy is deployed in a namespace corresponding to the namespace ID among a plurality of namespaces on the service execution platform 700 in accordance with the request. The proxy is associated with the API invocation limit and the authentication token information. After transmission of the request, the service deployment program 622 waits for a third deployment response as a response to the request for a predetermined time-out duration.

Subsequently at step S304, the service deployment program 622 checks whether the third deployment response has been received in the time-out duration. When the response has been received in the time-out duration, the processing proceeds to step S305. When no response has been received in the time-out duration, the processing proceeds to step S308, and the service deployment program 622 returns the second deployment response including error information to the external-service management program 522, and ends the processing.

Subsequently at step S305, the service deployment program 622 checks the content of the third deployment response from the service management program 722, and checks whether error exists in the third deployment request. When no error exists, the processing proceeds to step S306. When error exists, the processing proceeds to step S308, and the service deployment program 622 returns the second deployment response including error information to the external-service management program 522, and ends the processing.

Subsequently at step S306, the service deployment program 622 adds a result (specifically, an entry including the information 62401 to 62411) of the request at step S303 to the service deployment table 624.

Subsequently at step S307, the service deployment program 622 checks whether the addition processing to the service deployment table 624 at step 306 has been normally completed. When the addition processing has been normally completed, the processing proceeds to step S308 (YES). When error is returned as a result of the addition processing, the processing proceeds to step S308 (NO), and the service deployment program 622 returns the second deployment response including error information to the external-service management program 522, and ends the processing.

Subsequently at step S308, the service deployment program 622 returns the second deployment response as a result of completion of the processing according to the second deployment request to the external-service management program 522, and ends the processing. The second deployment response is associated with the end points of the external service and the proxy, and the authentication token information of the proxy.

<Explanation of Node Addition Processing>

Figure 13:
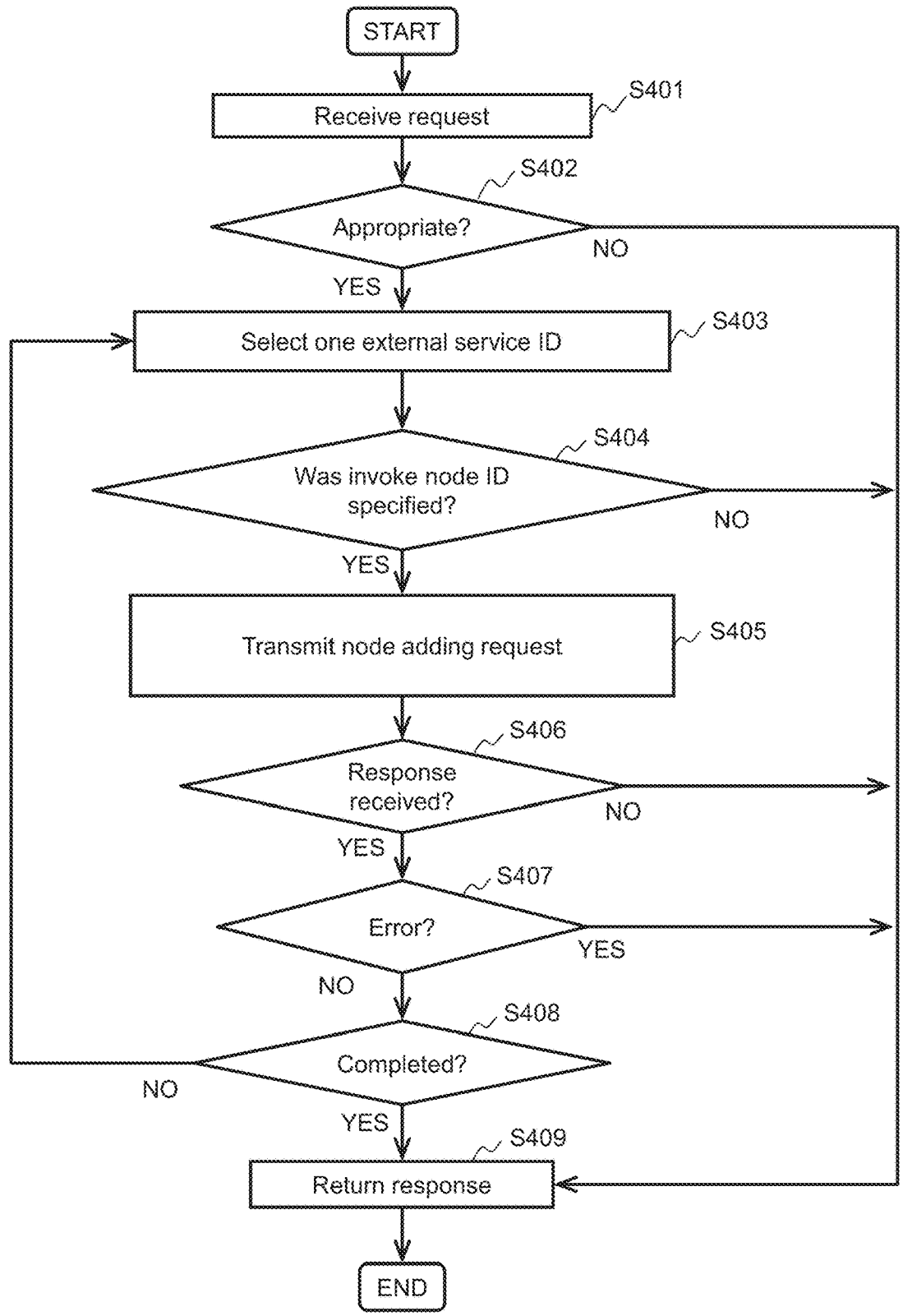
FIG. 13 is a diagram illustrating node addition processing performed by the template management program.

FIG. 13 is a diagram illustrating exemplary node addition processing performed by the invoke-node management program 528 of the external service manager 500.

First at step S401, the invoke-node management program 528 receives an invoke-node addition request from the template management program 322.

Subsequently at step S402, the invoke-node management program 528 determines whether a request argument received at step S401 is appropriate. Specifically, the template management program 322 determines that the argument is appropriate when an array of the external service IDs of external services to be added is specified in the argument. When the argument is appropriate, the processing proceeds to step S403. When the argument is not appropriate, the processing proceeds to step S410, and the template management program 322 returns a response including error information to the template management program 322, and ends the processing.

Subsequently at step S403, the invoke-node management program 528 selects one external service ID form the array of the request argument received at step S401.

Subsequently at step S404, the invoke-node management program 528 specifies the invoke node ID 52301 from the invoke node table 523 by using the selected external service ID as a key. When the invoke node ID 52301 is specified, the processing proceeds to step S405. When the invoke node ID 52301 cannot be specified, the processing proceeds to step S409, and the invoke-node management program 528 returns a response including error information to the template management program 322, and ends the processing.

Subsequently at step S405, the invoke-node management program 528 transmits a node addition request to the visual programming tool 40. The invoke node ID is specified in the request argument thereof. After transmission of the request, the invoke-node management program 528 waits for a response to the request for a predetermined time-out duration.

Subsequently at step S406, the invoke-node management program 528 checks whether the response has been received in the time-out duration. When the response has been received in the time-out duration, the processing proceeds to step S407. When no response has been received in the time-out duration, the processing proceeds to step S409, and the invoke-node management program 528 returns a response including error information to the template management program 322, and ends the processing.

Subsequently at step S407, the invoke-node management program 528 checks the response, and checks whether error exists in the request transmitted at step S405. When no error exists, the processing proceeds to step S408. When error exists, the processing proceeds to step S409, and the invoke-node management program 528 returns a response including error information to the template management program 322, and ends the processing.

Subsequently at step S408, the invoke-node management program 528 checks whether an external service ID is to be selected from the array of the request argument received at step S401. When an external service ID is to be selected, the processing returns to step S403. When no external service ID is to be selected, the processing proceeds to step S409.

Subsequently at step S409, the invoke-node management program 528 returns a response as a result of completion of the node addition processing to the template management program 322, and ends the processing.

In the present embodiment, the node addition processing is performed in accordance with a request from the template management program 322. Instead or in addition, the invoke-node management program 528 may perform step S405, for example, when addition of a new external service has been detected by the invoke-node management program 528.

<Explanation of External-Service Undeployment Processing>

FIG. 14 is a diagram illustrating exemplary external-service undeployment processing performed by the template management program 322 of the flow template manager 300.

First at step S501, the template management program 322 receives a request to undeploy an external service from the template GUI program 323. An argument associated with the request includes the resource ID (the ID of an instance of the external service), the site ID, and the group ID. The request may be transmitted, for example, when an invoke node is deleted from a flow on the flow editor GUI and the flow template manager 300 is notified of the deleted invoke node by the flow editor 41.

Subsequently at step S502, the template management program 322 determines whether the request argument received at step S01 is appropriate. Specifically, the template management program 322 determines that the argument is appropriate when the resource ID is specified in the argument. When the argument is appropriate, the processing proceeds to step S503. When the argument is not appropriate, the processing proceeds to step S506, and the template management program 322 returns a response including error information to the template GUI program 323 and ends the processing.

Subsequently at step S503, the template management program 322 transmits a first undeployment request as a request to undeploy an external service to the external-service management program 522 of the external service manager 500. The request argument includes the resource ID, the site ID, and the group ID included in the request argument received at step S503. After transmission of the request, the template management program 322 waits for a response (first undeployment response) to the request for a predetermined time-out duration.

Subsequently at step S504, when the first undeployment response has been received in the time-out duration, the processing proceeds to step S505. When no first undeployment response has been received in the time-out duration, the processing proceeds to step S506, and the template management program 322 returns a response including error information to the template GUI program 323 and ends the processing.

Subsequently at step S505, the template management program 322 checks the content of the first undeployment response from the external-service management program 522, and checks whether error exists in the first undeployment request. When no error exists, the processing proceeds to step S506 (NO). When error exists, the processing proceeds to step S506 (YES), and the template management program 322 returns a response including error information to the template GUI program 323 and ends the processing.

Subsequently at step S506, the template management program 322 returns a response indicating a result of completion of the external-service undeployment processing to the template GUI program 323, and ends the processing.

FIG. 15 is a diagram illustrating exemplary external-service undeployment processing performed by the external-service management program 522 of the external service manager 500.

First at step S601, the external-service management program 522 receives the first undeployment request from the template management program 322.

Subsequently at step S602, the external-service management program 522 determines whether the request argument received at step 601 is appropriate. Specifically, the external-service management program 522 determines that the argument is appropriate when the resource ID and the site ID are specified in the argument. When the argument is appropriate, the processing proceeds to step S603. When the argument is not appropriate, the processing proceeds to step S608, and the external-service management program 522 returns the first undeployment response including error information to the template management program 322, and ends the processing.

Subsequently at step S603, the external-service management program 522 specifies the service deployment manager ID 52501 from the service-deployment-manager table 525 by using, as a key, the site ID in the argument of the first undeployment request. When the service deployment manager ID 52501 is specified, the processing proceeds to step S604. When the service deployment manager ID 52501 cannot be specified, the processing proceeds to step S608, and the external-service management program 522 returns the first undeployment response including error information to the template management program 322, and ends the processing.

Subsequently at step S604, the external-service management program 522 transmits a second undeployment request as a request to undeploy an external instance (instance of the external service) specified by the above-described resource ID to the service deployment program 622 of the service deployment manager 600 corresponding to the specified service deployment manager ID 52501. The second undeployment request includes the resource ID and the group ID included in the argument of the first undeployment request. After transmission of the request, the external-service management program 522 waits for a response (second undeployment response) to the request for a predetermined time-out duration.

Subsequently at step S605, the external-service management program 522 checks whether the second undeployment response has been received in the time-out duration. When the second undeployment response has been received in the time-out duration, the processing proceeds to step S606. When no second undeployment response has been received in the time-out duration, the processing proceeds to step S608, and the external-service management program 522 returns the first undeployment response including error information to the template management program 322, and ends the processing.

Subsequently at step S606, the external-service management program 522 checks the content of the second undeployment response from the service deployment program 622, and checks whether error exists in the second undeployment request. When no error exists, the processing proceeds to step S607. When error exists, the processing proceeds to step S609, and the external-service management program 522 returns the first undeployment response including error information to the template management program 322, and ends the processing.

Subsequently at step S607, the external-service management program 522 refers to the site table 526 and checks whether the local flag 52603 corresponding to the site ID in the request argument received at step S601 is "true" (in other words, whether the site of the instance to be undeployed is local). When the site is local, the processing proceeds to step S608. When the site is not local, the processing returns to step S604. This is to undeploy, from the local site 80L, a proxy instance that performs communication with a proxy instance undeployed from the remote site 80R.

Subsequently at step S608, the external-service management program 522 returns the first undeployment response as a result of completion of the external-service deployment processing to the template management program 322, and ends the processing.

FIG. 16 is a diagram illustrating exemplary external-service undeployment processing performed by the service deployment program 622 of the service deployment manager 600.

First at step S701, the service deployment program 622 receives the second undeployment request from the external-service management program 522.

Subsequently at step S702, the service deployment program 622 determines whether the request argument received at step S701 is appropriate. Specifically, the service deployment program 622 determines that the argument is appropriate when the resource ID is specified in the argument. When the argument is appropriate, the processing proceeds to step S703. When the argument is not appropriate, the processing proceeds to step S708, and the service deployment program 622 returns the second undeployment response including error information to the external-service management program 522, and ends the processing.

Subsequently at step S703, the service deployment program 622 transmits a third undeployment request as a request to undeploy an instance corresponding to the above-described resource ID to the service management program 722 of the service execution platform 700. After transmission of the request, the service deployment program 622 waits for a response (third undeployment response) to the request for a predetermined time-out duration.

Subsequently at step S704, the service deployment program 622 checks whether the third undeployment response has been received in the time-out duration. When the third undeployment response has been received in the time-out duration, the processing proceeds to step S705. When no third undeployment response has been received in the time-out duration, the processing proceeds to step S708, and the service deployment program 622 returns the second undeployment response including error information to the external-service management program 522, and ends the processing.

Subsequently at step S705, the service deployment program 622 checks the content of the third undeployment response from the service management program 722, and checks whether error exists in the third undeployment request. When no error exists, the processing proceeds to step S706. When error exists, the processing proceeds to step S708, and the service deployment program 622 returns the second undeployment response including error information to the external-service management program 522, and ends the processing.

Subsequently at step S706, the service deployment program 622 deletes, from the service deployment table 624, an entry corresponding to the instance undeployed in accordance with the third undeployment request at step S703.

Subsequently at step S707, the service deployment program 622 checks whether the deletion processing at step 706 has been normally completed. When the deletion processing has been normally completed, the processing proceeds to step S708 (YES). When error is returned as a result of the deletion processing, the processing proceeds to step S708 (NO), and the service deployment program 622 returns the second undeployment response including error information to the external-service management program 522, and ends the processing.

Subsequently at step S708, the service deployment program 622 returns the second undeployment response indicating a result of completion of the external-service undeployment processing to the external-service management program 522, and ends the processing.

As described above, in the external-service undeployment processing according to the present embodiment, an instance is undeployed, but the body (original) of an invoke node corresponding to the undeployed instance is not deleted.

The embodiment is described above, but is merely exemplary for description of the present invention and not intended to limit the scope of the present invention to the present embodiment. The present invention can be achieved in other various kinds of forms. For example, the external service manager 500 may be included in the flow template manager 300.

What is claimed is:

1. A system that supports application software development, the system comprising:
   at least one memory storing at least one program;
   at least one processor which, when executing the at least one program, configures the processor to:
   receive a first deployment request as a request to deploy an external service corresponding to an invoke node when flow data of application software flow indicated by a flow template of application software flow is downloaded from a flow template manager to a flow editor of a visual programming tool, the flow template being expressed with a plurality of nodes including the invoke node and with a connection line between nodes among the plurality of nodes, wherein
   each of the plurality of nodes is associated with a property having one or a plurality of property elements each including a property item and a property value, and
   an invocation destination end point in the property of the invoke node is undetermined as a property value;
   transmit, in accordance with the first deployment request, a second deployment request as a request to deploy the external service identified by the first deployment request to a service deployment manager associated with a site corresponding to the external service, wherein the service deployment manager is configured to deploy the external service identified by the second deployment request on a service execution platform at the site and return a second deployment response as a response associated with the invocation destination end point corresponding to the external service to a transmission source of the second deployment request;
   return a first deployment response as a response associated with the invocation destination end point obtained from the second deployment response and set to the property of the invoke node by the flow template manager to a transmission source of the first deployment request; and
   request the visual programming tool to add an invoke node corresponding to an added external service,
   wherein a proxy of an external service associated with the received first deployment request is deployed in addition to the external service in accordance with the second deployment request for the external service.

2. The system according to claim 1, wherein the received first deployment request is associated with an external service ID of the external service and with a site ID of a site as a deployment destination of the external service.

3. The system according to claim 2, wherein the second deployment request is associated with an external service ID corresponding to the site and specified by the first deployment request.

4. The system according to claim 2, wherein the service deployment manager is associated with the site ID of the site and with an external service ID corresponding to the site ID.

5. The system according to claim 1, wherein, when the received first deployment request is associated with an invocation limit argument as an argument related to an invocation limit of the external service,
   the second deployment request is a request to deploy a proxy of the external service in addition to the external service,
   the second deployment request is associated with the invocation limit argument, and
   the first deployment response is associated with an end point of the proxy as an invocation destination end point set to the property of the invoke node and is associated with authentication information of the proxy as a property value set to the property of the invoke node.

6. The system according to claim 1, wherein, when the received first deployment request is associated with a group ID of a group to which a user of the application software flow belongs,
   the second deployment request is associated with the group ID, and
   the external service is deployed in a space corresponding to the group ID by a service deployment manager having received the second deployment request.

7. The system according to claim 1, wherein the site is one of a local site as a site at which a flow execution platform of the visual programming tool exists and a remote site as any site other than the local site.

8. The system according to claim 1, wherein the at least one processor is further configured to:
   receive a first undeployment request as a request to undeploy an external instance as the deployed external service, and
   transmit, in accordance with the first undeployment request, a second undeployment request as a request to undeploy an external instance identified by the first deployment request to a service deployment manager associated with a site at which the external instance exists,
wherein the service deployment manager undeploys an external instance identified by the second undeployment request from a service execution platform at the site, and returns a second undeployment response as a response indicating completion of the undeployment of the external instance to a transmission source of the second undeployment request, and
wherein the at least one processor is further configured to return a first undeployment response as a response based on the second undeployment response and as a response for deleting an invoke node corresponding to the external instance from the application software flow by the flow template manager without deleting a body of the invoke node to a transmission source of the first undeployment request.

9. The system according to claim 1, wherein,
there are a local site as a site at which a flow execution platform of the visual programming tool exists, and a remote site as any site other than the local site,
when a deployment destination of the external service is the remote site,
the at least one processor is further configured to transmit the second deployment request to deploy the external service and a first proxy of the external service to a service deployment manager corresponding to the remote site, and transmit the second deployment request to deploy a second proxy configured to perform communication with the first proxy to a service deployment manager corresponding to the local site, and the first deployment response is associated with an end point of the second proxy as an invocation destination end point associated with an invoke node corresponding to the external service.

10. A method that supports application software development, the method comprising:
receiving a first deployment request as a request to deploy an external service corresponding to an invoke node when flow data of application software flow indicated by a flow template of application software flow is downloaded from a flow template manager to a flow editor of a visual programming tool, the flow template being expressed with a plurality of nodes including the invoke node and with a connection line between nodes among the plurality of nodes, wherein
each of the plurality of nodes is associated with a property having one or a plurality of property elements each including a property item and a property value, and
an invocation destination end point in the property of the invoke node is undetermined as a property value;
transmitting, in accordance with the first deployment request, a second deployment request as a request to deploy the external service identified by the first deployment request to a service deployment manager associated with a site corresponding to the external service, wherein
the service deployment manager is associated with the site being configured to deploy the external service identified by the second deployment request on a service execution platform at the site and return a second deployment response as a response associated with the invocation destination end point corresponding to the external service to a transmission source of the second deployment request;
returning a first deployment response as a response associated with the invocation destination end point obtained from the second deployment response and set to the property of the invoke node by the flow template manager to a transmission source of the first deployment request; and
requesting the visual programming tool to add an invoke node corresponding to an added external service,
wherein a proxy of an external service associated with the received first deployment request is deployed in addition to the external service in accordance with the second deployment request for the external service.

11. A non-transitory computer readable medium storing at least one computer program which, when executed by a processor, configures the processor execute:
receiving a first deployment request as a request to deploy an external service corresponding to an invoke node when flow data of application software flow indicated by a flow template of application software flow is downloaded from a flow template manager to a flow editor of a visual programming tool, the flow template being expressed with a plurality of nodes including the invoke node and with a connection line between nodes among the plurality of nodes, wherein
each of the plurality of nodes is associated with a property having one or a plurality of property elements each including a property item and a property value, and
an invocation destination end point in the property of the invoke node is undetermined as a property value;
transmitting, in accordance with the first deployment request, a second deployment request as a request to deploy the external service identified by the first deployment request to a service deployment manager associated with a site corresponding to the external service, wherein the service deployment manager is associated with the site being configured to deploy the external service identified by the second deployment request on a service execution platform at the site and return a second deployment response as a response associated with the invocation destination end point corresponding to the external service to a transmission source of the second deployment request;
returning a first deployment response as a response associated with the invocation destination end point obtained from the second deployment response and set to the property of the invoke node by the flow template manager to a transmission source of the first deployment request; and
requesting the visual programming tool to add an invoke node corresponding to an added external service,
wherein a proxy of an external service associated with the received first deployment request is deployed in addition to the external service in accordance with the second deployment request for the external service.

* * * * *